United States Patent
Long et al.

(10) Patent No.: US 9,534,672 B2
(45) Date of Patent: Jan. 3, 2017

(54) VARIATOR SWITCHING VALVE SCHEME FOR A TORROIDAL TRACTION DRIVE TRANSMISSION

(71) Applicant: Allison Transmission, Inc., Indianapolis, IN (US)

(72) Inventors: Charles F. Long, Pittsboro, IN (US); Darren J. Weber, Indianapolis, IN (US); John W. E. Fuller, Preston (GB)

(73) Assignee: Allison Transmission, Inc., Indianapolis, IN (US)

( * ) Notice: Subject to any disclaimer, the term of this patent is extended or adjusted under 35 U.S.C. 154(b) by 85 days.

(21) Appl. No.: 14/494,288

(22) Filed: Sep. 23, 2014

(65) Prior Publication Data

US 2015/0011356 A1    Jan. 8, 2015

Related U.S. Application Data

(63) Continuation of application No. 13/325,372, filed on Dec. 14, 2011, now Pat. No. 8,840,522.

(Continued)

(51) Int. Cl.

| | | |
|---|---|---|
| *F16H 61/664* | (2006.01) | |
| *F16H 15/40* | (2006.01) | |
| *F16H 61/02* | (2006.01) | |

(52) U.S. Cl.
CPC .......... *F16H 15/40* (2013.01); *F16H 61/0265* (2013.01); *F16H 61/664* (2013.01); *F16H 61/6648* (2013.01)

(58) Field of Classification Search
CPC .. F16H 61/6648; F16H 61/0265; F16H 15/40; F16H 61/664
See application file for complete search history.

(56) References Cited

U.S. PATENT DOCUMENTS 3,570,317 A * 3/1971 Kraus ................ F16H 61/6649
                                                            476/10
4,285,639 A   8/1981 Woodring et al.
(Continued)

FOREIGN PATENT DOCUMENTS

CN      1576659     2/2005
CN      1788172     6/2006
(Continued)

OTHER PUBLICATIONS

Torotrak Full toroidal variator (http://www.torotrak.com/IVT/works/variator.htm) 5 pages (accessed Sep. 24, 2009).
(Continued)

*Primary Examiner* — David M Fenstermacher
(74) *Attorney, Agent, or Firm* — Barnes & Thornburg LLP

(57) ABSTRACT

An apparatus for controlling a variator having at least one roller between two torroidal disks may include at least one actuator responsive to fluid pressure at separate high side and low side fluid inlets thereof to control torque applied by the at least one roller to the disks. First and second variator switching valves may each receive a first fluid at a first pressure and a second fluid at a second lesser pressure. The first and second variator switching valves supply the first fluid to the high side fluid inlet and the second fluid to the low side fluid inlet during two of four different operational states together defined by the variator switching valves, and supply the second fluid to the high side fluid inlet and the first fluid to the low side fluid inlet during each of the remaining two of the four different operational states.

20 Claims, 5 Drawing Sheets

Related U.S. Application Data

(60) Provisional application No. 61/423,293, filed on Dec. 15, 2010.

(56) References Cited

U.S. PATENT DOCUMENTS

| | | | |
|---|---|---|---|
| 4,838,126 A * | 6/1989 | Wilfinger | F16H 61/0206 477/129 |
| 4,922,788 A | 5/1990 | Greenwood | |
| 5,090,951 A | 2/1992 | Greenwood | |
| 5,217,418 A | 6/1993 | Fellows et al. | |
| 5,232,414 A | 8/1993 | Fellows et al. | |
| 5,242,337 A | 9/1993 | Greenwood | |
| 5,263,907 A | 11/1993 | Fellows | |
| 5,308,297 A | 5/1994 | Greenwood | |
| 5,308,298 A | 5/1994 | Lambert | |
| 5,316,526 A | 5/1994 | Fellows | |
| 5,338,268 A | 8/1994 | Greenwood | |
| 5,395,292 A | 3/1995 | Fellows et al. | |
| 5,401,221 A | 3/1995 | Fellows et al. | |
| 5,423,727 A | 6/1995 | Fellows | |
| 5,437,204 A | 8/1995 | Person | |
| 5,453,061 A | 9/1995 | Fellows | |
| 5,521,819 A | 5/1996 | Greenwood | |
| 5,564,993 A | 10/1996 | Robinson | |
| 5,564,998 A | 10/1996 | Fellows | |
| 5,643,121 A | 7/1997 | Greenwood et al. | |
| 5,667,456 A | 9/1997 | Fellows | |
| 5,766,105 A | 6/1998 | Fellows et al. | |
| 5,820,508 A | 10/1998 | Konig et al. | |
| 5,820,513 A | 10/1998 | Greenwood | |
| 5,895,337 A | 4/1999 | Fellows et al. | |
| 5,938,557 A | 8/1999 | Greenwood | |
| 5,971,885 A | 10/1999 | Greenwood et al. | |
| 6,030,310 A | 2/2000 | Greenwood et al. | |
| 6,066,067 A | 5/2000 | Greenwood | |
| 6,071,209 A | 6/2000 | Greenwood | |
| 6,273,839 B1 | 8/2001 | Dutson | |
| 6,292,732 B1 * | 9/2001 | Steinmetz | F16H 61/061 192/109 F |
| 6,306,060 B1 | 10/2001 | Dutson et al. | |
| 6,312,356 B1 | 11/2001 | Greenwood | |
| 6,364,811 B1 * | 4/2002 | Hubbard | F16H 61/061 477/107 |
| 6,464,614 B2 | 10/2002 | Dutson | |
| 6,626,793 B1 | 9/2003 | Greenwood | |
| 6,666,791 B1 | 12/2003 | Greenwood | |
| 6,979,276 B2 | 12/2005 | Murray | |
| 7,018,320 B2 | 3/2006 | Robinson et al. | |
| 7,056,261 B2 * | 6/2006 | Fuller | F16H 61/6648 476/10 |
| 7,160,226 B2 | 1/2007 | Fuller | |
| 7,278,951 B2 | 10/2007 | Fuller | |
| 7,318,786 B2 | 1/2008 | Greenwood et al. | |
| 7,407,459 B2 | 8/2008 | Greenwood et al. | |
| 7,491,149 B2 | 2/2009 | Greenwood et al. | |
| 7,530,916 B2 | 5/2009 | Greenwood | |
| 7,563,194 B2 | 7/2009 | Murray | |
| 7,614,973 B2 | 11/2009 | Parthuisot | |
| 7,625,309 B2 | 12/2009 | Fuller | |
| 7,632,208 B2 | 12/2009 | Greenwood et al. | |
| 7,637,841 B2 | 12/2009 | Dutson | |
| 7,951,041 B2 | 5/2011 | Dutson | |
| 7,955,210 B2 | 6/2011 | Greenwood et al. | |
| 8,108,108 B2 * | 1/2012 | Field | B60W 10/06 180/197 |
| 8,727,937 B2 * | 5/2014 | Tabuchi | F16H 61/6648 476/10 |
| 8,840,522 B2 | 9/2014 | Long et al. | |
| 2001/0041642 A1 | 11/2001 | Miyata | |
| 2004/0038773 A1 | 2/2004 | Robinson et al. | |
| 2005/0043138 A1 | 2/2005 | Fuller | |
| 2005/0143216 A1 | 6/2005 | Greenwood et al. | |
| 2005/0176547 A1 | 8/2005 | DeFreitas | |
| 2005/0211295 A1 | 9/2005 | Long et al. | |
| 2006/0142110 A1 | 6/2006 | Greenwood et al. | |
| 2006/0160656 A1 | 7/2006 | Dutson | |
| 2006/0184303 A1 | 8/2006 | Long et al. | |
| 2006/0201766 A1 | 9/2006 | Fuller | |
| 2007/0072736 A1 | 3/2007 | DeFreitas et al. | |
| 2007/0112495 A1 | 5/2007 | Murray | |
| 2007/0142163 A1 | 6/2007 | Murray | |
| 2007/0275817 A1 | 11/2007 | Newall | |
| 2008/0085801 A1 | 4/2008 | Sedoni et al. | |
| 2008/0146399 A1 | 6/2008 | Oliver et al. | |
| 2008/0153659 A1 | 6/2008 | Greenwood | |
| 2008/0176709 A1 | 7/2008 | Wu et al. | |
| 2008/0269001 A1 | 10/2008 | Greenwood et al. | |
| 2009/0048054 A1 | 2/2009 | Tsuchiya et al. | |
| 2009/0062065 A1 | 3/2009 | Field et al. | |
| 2009/0075772 A1 * | 3/2009 | Ellis | F16H 61/0206 475/31 |
| 2009/0203486 A1 | 8/2009 | Murray | |
| 2009/0253552 A1 | 10/2009 | Foster | |
| 2009/0305840 A1 | 12/2009 | Oliver | |
| 2010/0035720 A1 | 2/2010 | Tabuchi et al. | |
| 2011/0138898 A1 | 6/2011 | Long et al. | |
| 2011/0140017 A1 | 6/2011 | Long et al. | |
| 2011/0143882 A1 | 6/2011 | Long et al. | |
| 2011/0144872 A1 * | 6/2011 | Long | F16H 61/18 701/58 |
| 2011/0144925 A1 | 6/2011 | Long et al. | |
| 2011/0152031 A1 | 6/2011 | Schoolcraft | |

FOREIGN PATENT DOCUMENTS

| | | |
|---|---|---|
| CN | 102713368 | 10/2012 |
| EP | 1876375 A1 | 1/2008 |
| GB | 2361510 A | 10/2001 |
| GB | 2368618 A | 5/2002 |
| GB | 2384531 A | 7/2003 |
| GB | 2397630 A | 7/2004 |
| GB | 2410302 A | 7/2005 |
| GB | 2418235 A | 3/2006 |
| GB | 2438412 A | 11/2007 |
| GB | 2440746 A | 2/2008 |
| GB | 2455030 A | 6/2009 |
| GB | 2459857 A | 11/2009 |
| GB | 2460237 A | 11/2009 |
| GB | 2470717 A | 12/2010 |
| GB | 2474870 A | 5/2011 |
| JP | 2003120797 | 4/2003 |
| WO | 9740292 A1 | 10/1997 |
| WO | 02088577 | 11/2002 |

OTHER PUBLICATIONS

International Search Report and the Written Opinion for International Application No. PCT/US11/64818, dated Apr. 19, 2012 (9 pages).
U.S. Appl. No. 13/325,412, filed Dec. 14, 2011; Long et al.
U.S. Appl. No. 13/325,355, filed Dec. 14, 2011; Long et al.
Chinese Search Report and English Translation for Application No. 201180067546.3, dated Feb. 2, 2015, 15 pages.
International Preliminary Report on Patentability for International Application No. PCT/US2011/064818, issued Oct. 22, 2013, 7 pages.
Examiner's First Report from the Australian Government for Application No. 2011343891, issued Oct. 8, 2015, 4 pages.
Supplementary European Search Report for Application No. 11848755.2, dated Jun. 27, 2016, 5 pages.

* cited by examiner

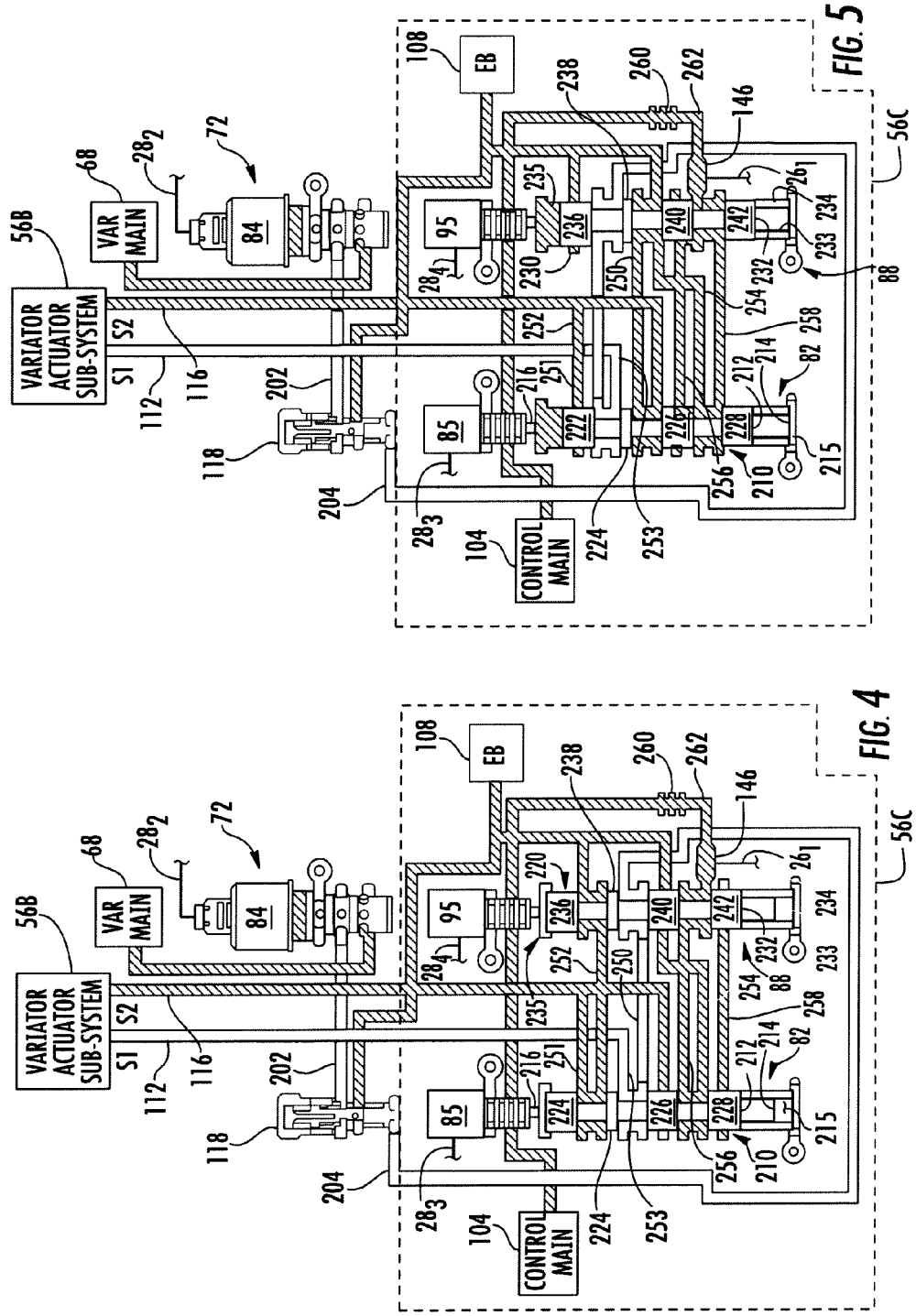

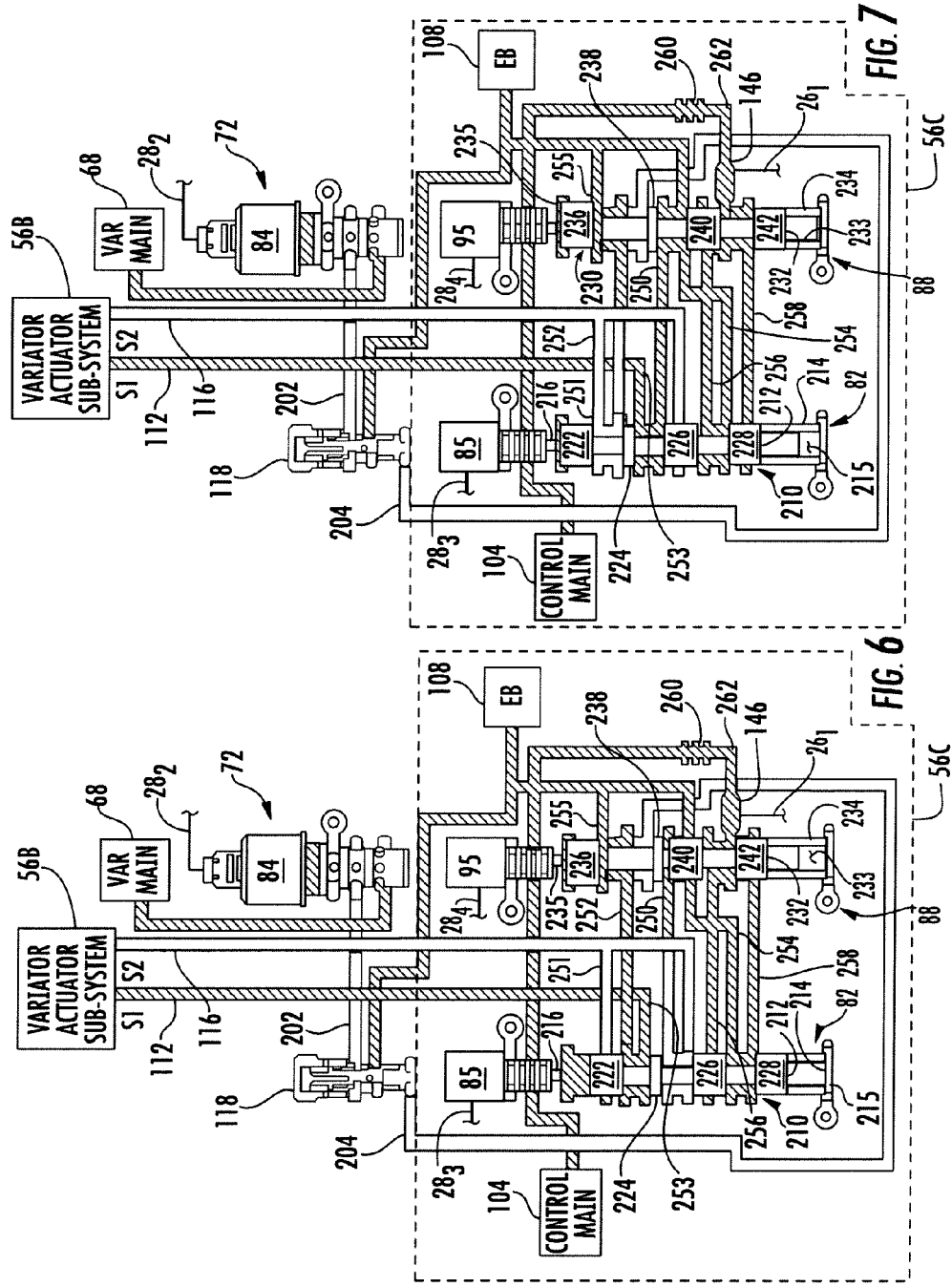

VARIATOR SWITCHING VALVE SCHEME FOR A TORROIDAL TRACTION DRIVE TRANSMISSION

CROSS-REFERENCE TO RELATED APPLICATIONS

This application is a continuation application of U.S. application Ser. No. 13/325,372, entitled "VARIATOR SWITCHING VALVE SCHEME FOR A TORROIDAL TRACTION DRIVE TRANSMISSION," which was filed on Dec. 14, 2011, and which claims priority under 35 U.S.C. §119(e) to U.S. Provisional Application Ser. No. 61/423,293, filed Dec. 15, 2010, the entirety of both of which is incorporated herein by reference.

TECHNICAL FIELD

The present invention relates generally to torroidal traction drive automatic transmissions, and more specifically to systems and methods for switching between directions of torque transmitted by a variator in such a transmission.

BACKGROUND

Torroidal traction drive automatic transmissions may typically include a variator and one or more gear sets. Within each gear set, the variator may generally control a direction, e.g., positive or negative, and magnitude of torque transferred by a power plant to one or more loads. Structures and techniques for switching between directions of torque transmitted by the variator from the power plant to the one or more loads must therefore be designed and implemented.

SUMMARY

The present application discloses one or more of the features recited in the appended claims and/or the following features which alone or in any combination, may comprise patentable subject matter.

An apparatus may control a variator having at least one roller between a first torroidal disk coupled to an input of an automatic transmission and a second torroidal disk coupled to an output of the transmission. The apparatus may comprise at least one actuator responsive to fluid pressure at separate high side and low side fluid inlets thereof to control torque applied by the at least one roller to the first and second torroidal disks, and first and second variator switching valves each receiving a first fluid at a first pressure and a second fluid at a second pressure less than the first pressure. The first and second variator switching valves may together define four different operational states and supply the first fluid to the high side fluid inlet of the at least one actuator and the second fluid to the low side fluid inlet of the at least one actuator during each of two of the four different operational states and supply the second fluid to the high side fluid inlet of the at least one actuator and the first fluid to the low side fluid inlet of the at least one actuator during each of the remaining two of the four different operational states.

Each of the first and second variator switching valves may define a stroked state and an opposite destroked state. The first and second variator switching valves may supply the first fluid to the high side fluid inlet of the at least one actuator and the second fluid to the low side fluid inlet of the at least one actuator when the first and second variator switching valves are both stroked and also when the first and second variator switching valves are both destroked. The first and second variator switching valves may further supply the second fluid to the high side fluid inlet of the at least one actuator and the first fluid to the low side fluid inlet of the at least one actuator when the first variator switching valve is stroked and the second variator switching valve is destroked and also when the second variator switching valve is stroked and the first variator switching valve is destroked. Alternatively, the first and second variator switching valves supply the second fluid to the high side fluid inlet of the at least one actuator and the first fluid to the low side fluid inlet of the at least one actuator when the first and second variator switching valves are both stroked and when the first and second variator switching valves are both destroked, and the first and second variator switching valves may supply the first fluid to the high side fluid inlet of the at least one actuator and the second fluid to the low side fluid inlet of the at least one actuator when the first variator switching valve is stroked and the second variator switching valve is destroked and also when the second variator switching valve is stroked and the first variator switching valve is destroked.

The at least one actuator may be responsive to fluid pressure at the high side fluid inlet being greater than fluid pressure at the low side fluid inlet to control the at least one roller to transfer one of a positive and a negative torque to the first and second torroidal disks, and may be responsive to fluid pressure at the low side fluid inlet being greater than fluid pressure at the high side fluid inlet to control the at least one roller to transfer the other of the positive and negative torque to the first and second torroidal disks.

The apparatus may further comprise a control circuit including a memory having instructions stored therein that are executable by the control circuit to control the first and second variator switching valves between the four different operational states. The first variator switching valve may include a first actuator responsive to a first control signal to control the first variator switching valve to a stroked operational state and to a second control signal to control the first variator switching valve to a destroked operational state. The second variator switching valve may include a second actuator responsive to a third control signal to control the second variator switching valve to a stroked operational state and to a fourth control signal to control the second variator switching valve to a destroked operational state. The control circuit may produce the first and second control signals according to the instructions stored in the memory. The first and second variator switching valves may supply the first fluid to the high side fluid inlet of the at least one actuator and the second fluid to the low side fluid inlet of the at least one actuator when the first and second variator switching valves are both in their stroked operational states and when the first and second variator switching valves are both in their destroked operational states. The at least one actuator may be responsive to fluid pressure at the high side fluid inlet being greater than fluid pressure at the low side fluid inlet to control the at least one roller to transfer one of a positive and a negative torque to the first and second torroidal disks, and the instructions stored in the memory may include instructions executable by the control circuit to produce the first and third control signals or the second and fourth signals to control the at least one roller to transfer the one of the positive and the negative torque to the first and second torroidal disks. The first and second variator switching valves may further supply the first fluid to the low side fluid inlet of the at least one actuator and the second fluid to the high side fluid inlet of the at least one actuator when one of the first and second variator switching valves is in its stroked state and the other of the first and second variator switching valves is in its destroked state. The at least one actuator may be responsive to fluid pressure at the low side fluid inlet being greater than fluid pressure at the high side fluid inlet to control the at least one roller to transfer one of a positive and a negative torque to the first and second torroidal disks, and the instructions stored in the memory may include instructions executable by the control circuit to produce the first and fourth control signals or the second and third signals to control the at least one roller to transfer the one of the positive and the negative torque to the first and second torroidal disks.

The apparatus may further comprise a pressure sensor fluidly coupled to at least one of the first and second variator switching valves such that the pressure sensor produces a first sensor signal when the first and second variator switching valves are in either of the two of the four different operational states and produces a second sensor signal when the first and second variator switching valves are in either of the remaining two of the four different operational states. The pressure sensor may be electrically connected to the control circuit, and the instructions stored in the memory may include instructions executable by the control circuit to monitor operation of the pressure sensor and determine that the first and second variator switching valves are supplying the first fluid to the high side fluid inlet of the at least one actuator and the second fluid to the low side fluid inlet of the at least one actuator when the pressure sensor produces the first sensor signal and that the first and second variator switching valves are supplying the second fluid to the high side fluid inlet of the at least one actuator and the first fluid to the low side fluid inlet of the at least one actuator when the pressure sensor produces the second sensor signal.

The apparatus may further comprise means for supplying the first fluid with the first fluid pressure being either constant or variable.

The apparatus may further comprise means for supplying the second fluid with the second fluid pressure being exhaust.

An apparatus may control a variator having at least one roller between a first torroidal disk coupled to an input of an automatic transmission and a second torroidal disk coupled to an output of the transmission. The apparatus may comprise at least one actuator responsive to fluid pressure at separate high side and low side fluid inlets thereof to control torque applied by the at least one roller to the first and second torroidal disks, and first and second variator switching valves each receiving a first fluid at a first pressure and a second fluid at a second pressure less than the first pressure. The first and second variator switching valves may be controllable to supply the first and second fluids to the at least one actuator. A pressure sensor may be fluidly coupled to at least one of the first and second variator switching valves. The pressure sensor may produce a first signal when the first and second variator switching valves are supplying the first fluid to the high side fluid inlet of the at least one actuator and the second fluid to the low side fluid inlet of the at least one and the pressure sensor producing a second signal different from the first signal when the first and second variator switching valves are supplying the second fluid to the high side fluid inlet of the at least one actuator and the first fluid to the low side fluid inlet of the at least one actuator.

The apparatus may further comprise a control circuit electrically connected to the pressure sensor. The control circuit may include a memory having instructions stored therein executable by the control circuit to monitor operation of the pressure sensor and determine that the first and second variator switching valves are supplying the first fluid to the high side fluid inlet of the at least one actuator and the second fluid to the low side fluid inlet of the at least one actuator when the pressure sensor produces the first sensor signal and that the first and second variator switching valves are supplying the second fluid to the high side fluid inlet of the at least one actuator and the first fluid to the low side fluid inlet of the at least one actuator when the pressure sensor produces the second sensor signal.

The first and second variator switching valves may together define four different operating states. The instructions stored in the memory may further include instructions executable by the control circuit to control the first and second variator switching valves between the four different operational states. The first and second variator switching valves may be configured to supply the first fluid to the high side fluid inlet of the at least one actuator and the second fluid to the low side fluid inlet of the at least one actuator when the first and second variator switching valves are in either of two of the four different operating states and to supply the second fluid to the high side fluid inlet of the at least one actuator and the first fluid to the low side fluid inlet of the at least one actuator when the first and second variator switching valves are in either of the remaining two of the four different operating states.

A method for controlling a variator having at least one roller between a first torroidal disk coupled to an input of an automatic transmission and a second torroidal disk coupled to an output of the transmission and at least one actuator responsive to fluid pressure at separate high side and low side fluid inlets thereof to control torque applied by the at least one roller to the first and second torroidal disks. The method may comprise supplying a first fluid at a first pressure and a second fluid at a second pressure less than the first pressure to first and second variator switching valves, the first and second variator switching valves each defining two different operating states such that the first and second variator switching valves together define four different operating states, supplying the first fluid to the high side fluid inlet of the at least one actuator and the second fluid to the low side fluid inlet of the at least one actuator when the first and second variator switching valves are in either of two of the four different operational states, and supplying the second fluid to the high side fluid inlet of the at least one actuator and the first fluid to the low side fluid inlet of the at least one actuator when the first and second variator switching valves are in either of the remaining two of the four different operational states.

The method may further comprise monitoring a pressure associated with at least one of the first and second variator switching valves, and determining from the monitored pressure whether the first and second variator switching valves are supplying the first fluid to the high side fluid inlet of the at least one actuator and the second fluid to the low side fluid inlet of the at least one actuator or are supplying the second fluid to the high side fluid inlet of the at least one actuator and the first fluid to the low side fluid inlet of the at least one actuator.

Additional features and advantages of the invention will become apparent to those skilled in the art upon consideration of the following detailed description of illustrated embodiments exemplifying the best mode of carrying out the invention as presently perceived.

DESCRIPTION OF THE DRAWINGS

The systems and methods described herein are illustrated by way of example and not by way of limitation in the accompanying figures. For simplicity and clarity of illustration, elements illustrated in the FIGS. are not necessarily drawn to scale. For example, the dimensions of some elements may be exaggerated relative to other elements for clarity. Further, where considered appropriate, reference labels have been repeated among the FIGS. to indicate corresponding or analogous elements.

FIG. 4 is a magnified view of the variator switching sub-system of the electro-hydraulic control system illustrated in FIG. 3 showing one set of operating states of the two illustrated variator switching valves.

FIG. 5 is a view similar to that of FIG. 4 showing another set of operating states of the two illustrated variator switching valves.

FIG. 6 is another view similar to that of FIG. 4 showing yet another set of operating states of the two illustrated variator switching valves.

FIG. 7 is yet another view similar to that of FIG. 4 showing still another set of operating states of the two illustrated variator switching valves.

DETAILED DESCRIPTION

Figure 1:
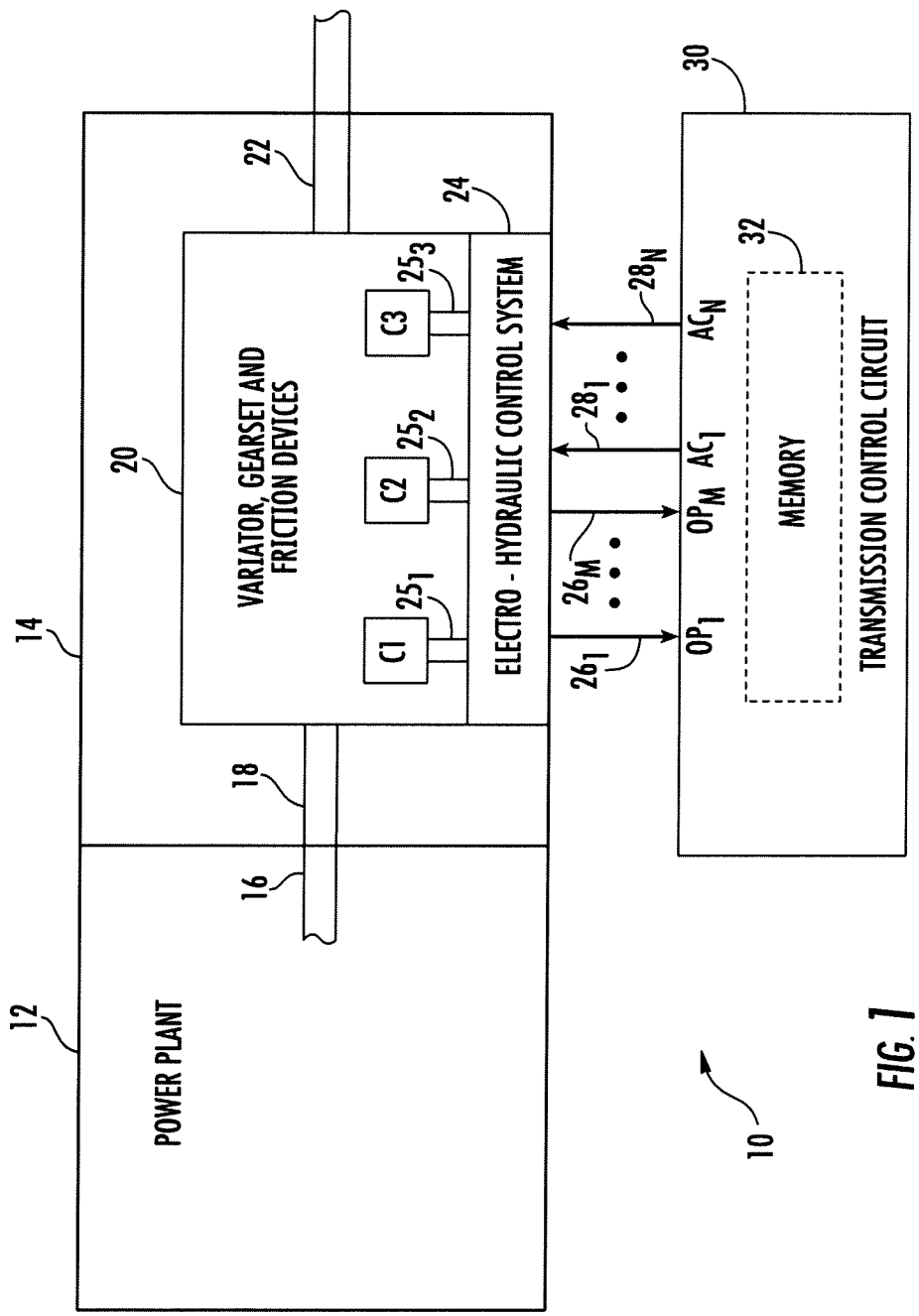
FIG. 1 is a block diagram of one illustrative embodiment of a system for controlling operation of a toroidal traction drive automatic transmission.

For the purposes of promoting an understanding of the principles of the invention, reference will now be made to a number of illustrative embodiments shown in the attached drawings and specific language will be used to describe the same.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Referring now to FIG. 1, a block diagram is shown of one illustrative embodiment of a system 10 for controlling operation of a toroidal traction drive automatic transmission 14. In the illustrated embodiment, a power plant or energy center 12 is coupled to an automatic transmission 14 such that a rotatable output shaft 16 of the power plant 12 is coupled to a rotatable input shaft 18 of the transmission 14 in a conventional manner. The input shaft 18 is coupled, in the illustrated embodiment, to a combination variator and gear set 20 that further includes a plurality of selectively engageable friction devices, e.g., one or more conventional, selectively engageable clutches or the like, and an output of the combination variator and gear set 20 is coupled to a rotatable output shaft 22. The combination variator and gear set 20 is illustratively controlled by an electro-hydraulic control system 24, some of the details of which will be described in greater detail hereinafter.

The power plant 12 is generally an apparatus that produces rotational drive power at the output shaft 16. Examples of the power plant 12 include, but should not be limited to, one or any combination of a one or more engines, such as an internal combustion engine of the spark ignited, compression ignition or other variety, a steam engine, or type of engine that produces mechanical energy from one or more other fuel sources, one or more electrical generators, and the like.

Figure 2A:
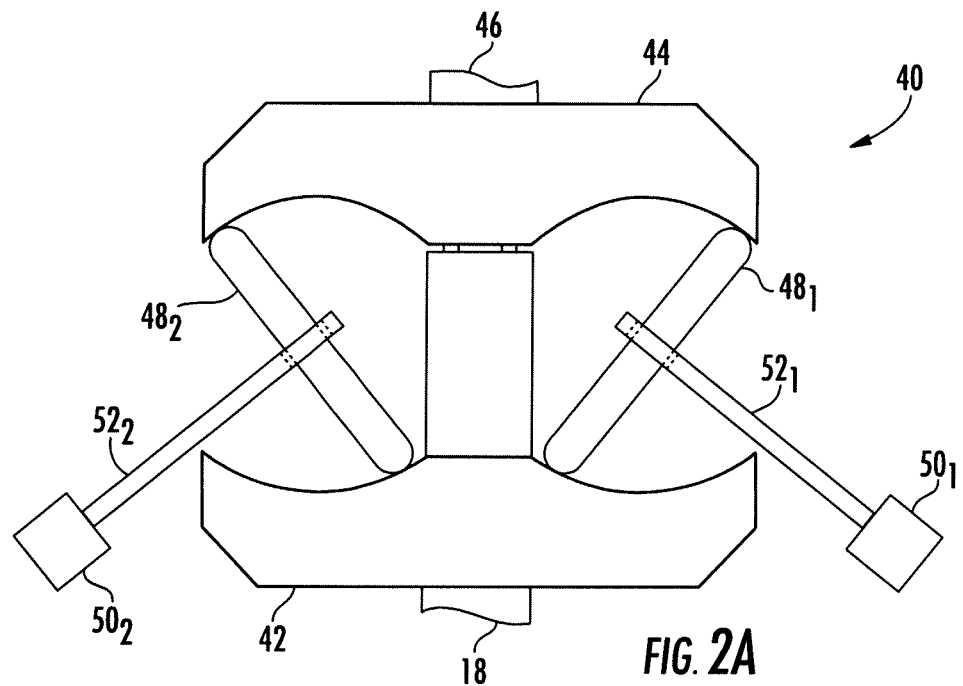
FIG. 2A is a diagram illustrating operation of one illustrative embodiment of a variator that forms part of the toroidal traction drive automatic transmission illustrated in FIG. 1.
Figure 2B:
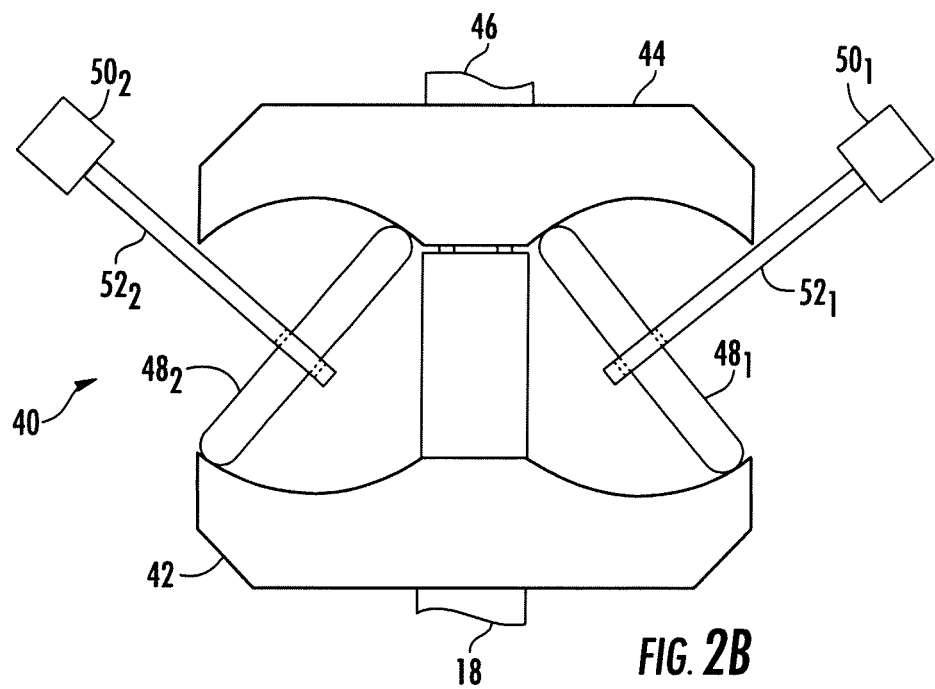
FIG. 2B is a diagram further illustrating operation of the variator of FIG. 2A.

The combination variator and gear set 20 illustratively includes a conventional full-toroidal, traction-drive variator that is coupled to a conventional gear set. Referring to FIGS. 2A and 2B, one illustrative embodiment of some of the structural features of such a full-toroidal, traction-drive variator 40 is shown. In the illustrated embodiment, the variator 40 includes a pair of opposing, toroidal-shaped disks 42 and 44 that rotate independently of each other. For example, the disk 42 is illustratively directly connected to the input shaft 18 of the transmission 14 such that the disk 42 is directly rotatably driven by the power plant 12. Alternatively, the disk 42 may be connected to the input shaft 18 of the transmission through one or more structures, e.g., one or more gear sets or other structures. For purposes of this disclosure, the term "coupled" used to described the relationship between the disk 42 and the input shaft 18 of the transmission is defined as either a direct connection, i.e., engagement, between the disk 42 and the input shaft 18 of the transmission 14 or an indirect connection between the disk 42 and the input shaft 18 of the transmission 14 through one or more structures interposed between the disk 42 and the input shaft 18 of the transmission 14. Illustratively, the disk 44 is rigidly coupled to an output shaft 46 of the variator 40, and is rotatably coupled to the shaft 18 such that the disk 44 rotates freely about the shaft 18. The output shaft 46 of the variator 40 is coupled directly, or indirectly through one or more transmission gears, to the output shaft 22 of the transmission 14 such that output shaft 46 of the variator 40 drives one or more wheels of a vehicle (not shown) carrying the power plant 12 and transmission 14.

A number of rollers 48 are illustratively positioned between opposing inner, arcuate-shaped surfaces, e.g., concave surfaces, of the disks 42 and 44, and a traction fluid (not shown) is disposed between the rolling surface of each such roller 48 and the inner surfaces of the disks 42 and 44. In the illustrated embodiment, the rolling surfaces of the various rollers 48 therefore do not contact, in a structural sense, the inner surface of either disk 42, 44; rather torque is transmitted by the various rollers 48 between the two disks 42, 44 via the traction fluid. It is because torque is transferred between the two disks 42, 44 via the traction fluid and not via structural contact between the rolling surfaces of the rollers 48 and the arcuate inner surfaces of the disks 42, 44 that the variator is referred to as a traction-drive apparatus.

In the embodiment illustrated in FIGS. 2A and 2B, two such rollers $48_1$ and $48_2$ are shown operatively positioned between the opposing inner surfaces of the two disks 42, 44. A roller actuator $50_1$, e.g., in the form of a conventional hydraulically actuated piston, is coupled to the roller $48_1$ via a bracket $52_1$, and another roller actuator $50_2$, e.g., in the form of another conventional hydraulically actuated piston, is coupled to the roller $48_2$ via a bracket $52_2$. It will be understood that the brackets $52_1$ and $52_2$ do not represent rotatable shafts about which the rollers $48_1$ and $48_2$ may be rotatably driven. Rather, the brackets $52_1$ and $52_2$ represent structures about which the rollers $48_1$ and $48_2$ rotate. In one actual implementation, for example, the brackets $52_1$ and $52_2$ are configured to attach to the central hub of the rollers $48_1$ and $48_2$ on either side thereof such that the brackets $52_1$ and $52_2$ and actuators $50_1$ and $50_2$ would extend generally perpendicular to the page illustrating FIGS. 2A and 2B.

The hydraulically controlled actuators $50_1$ and $50_2$ are each illustratively controllable by selectively controlling a high-side hydraulic pressure applied to one side of the actuators $50_1$ and $50_2$ and a low-side hydraulic pressure applied to the opposite side of the actuators $50_1$ and $50_2$. Traction force generated by the net hydraulic pressure, i.e., the difference between the applied high and low side hydraulic pressures, is transmitted by the rollers $48_1$ and $48_2$ to the two disks 42, 44 via the traction fluid, and this applied traction force defines the torque transmitted between the two disks 42, 44. Thus, a direct relationship exists between the net hydraulic pressure applied to the actuators $50_1$ and $50_2$ and the magnitude of the torque transmitted between the two disks 42, 44. Each roller $48_1$ and $48_2$ moves and precesses to the location and tilt angle relative to the disks 42, 44 required to transmit the torque to the disks 42, 44 defined by the net hydraulic pressure applied to the hydraulic actuators $50_1$ and $50_2$. A difference in the magnitude of the net hydraulic pressure applied to the actuators $50_1$ and $50_2$ changes the torque transmitted to the output shaft. The direction of the torque applied by the rollers $48_1$ and $48_2$ to the two disks 42, 44, is determined by the relative magnitudes of the high and low side pressures applied to the actuators $50_1$ and $50_2$. In one illustrative embodiment, for example, the rollers $48_1$ and $48_2$ apply a positive torque to the two disks 42, 44 if the high side hydraulic pressure is greater than the low side hydraulic pressure, and the rollers $48_1$ and $48_2$ conversely apply a negative torque to the two disks if the low side pressure is greater than the high side hydraulic pressure. In alternative embodiments, the rollers $48_1$ and $48_2$ may apply a positive torque to the two disks 42, 44 if the low side hydraulic pressure is greater than the high side hydraulic pressure, and the rollers $48_1$ and $48_2$ may conversely apply a negative torque to the two disks if the high side pressure is greater than the low side hydraulic pressure. In any case, the rollers $48_1$ and $48_2$ are free-castoring, and are responsive to the actuators $50_1$ and $50_2$ to seek a position that provides the correct ratio match of engine and drive train speeds based on input energy equaling output energy.

In one illustrative implementation, the variator 40 includes two sets or pairs of disks 42 and 44, with the pairs of the disks 42 rigidly coupled to each other and with the pairs of the disks 44 also rigidly coupled to each other, such that the embodiment illustrated in FIGS. 2A and 2B represents one-half of such an implementation. In this illustrative implementation, three rollers are positioned between each opposing set of disks 42, 44 for a total of six rollers $48_1$-$48_6$ and six corresponding hydraulically controlled actuators $50_1$-$50_6$. It will be understood, however, that this particular implementation of the variator 40 is shown and described only by way of example, and that other embodiments of the variator 40 that include more or fewer pairs of disks 42, 44, that include more or fewer rollers 48 and hydraulically controlled actuators 50, and/or that are configured to be only partially toroidal in shape, may alternatively be used. It will further be understood that while the operation of the variator 40 is illustrated and described herein as being generally hydraulically controlled, this disclosure contemplates embodiments in which operation of the variator 40 is controlled via purely electronic or electro-mechanical structures.

Referring again to FIG. 1, the gear set within the combination variator and gear set 20 illustratively includes one or more conventional planetary gear set(s) and/or other gear set(s) that define(s) at least two automatically selectable gear ratios and that is coupled to, or integrated with, the variator, e.g., the variator 40 illustrated and described with respect to FIG. 2. The combination variator and gear set 20 further illustratively includes a number of conventional friction devices, e.g., clutches, which may be selectively controlled to thereby control shifting of the transmission 14 between the two or more gear ratios. In alternate embodiments, the gear set may include more than one planetary gear set, one or more planetary gear sets in combination with one or more other conventional gear sets, or exclusively one or more non-planetary gear sets.

In the example embodiment illustrated in FIG. 1, the transmission 14 includes three friction devices, e.g., in the form of three conventional clutches C1, C2 and C3. In this embodiment, each clutch C1, C2 and C3 is operated in a conventional manner, e.g., via fluid pressure, under the control of the electro-hydraulic control system 24. In this regard, a fluid path $25_1$ is fluidly coupled between the electro-hydraulic control system 24 and the clutch. C1, a fluid path $25_2$ is fluidly coupled between the electro-hydraulic control system 24 and the clutch C2, and a fluid path $25_3$ is fluidly coupled between the electro-hydraulic control system 24 and the clutch C3. The electro-hydraulic control system 24 is operable to control operation of the clutches C1-C3 by controlling fluid pressure within the fluid paths $25_1$-$25_3$ respectively.

The gear set and the clutches C1, C2 and C3 are illustratively arranged to provide four separate modes of operation of the transmission 14, and the various operating modes of the transmission 14 are selectively controlled by the operation of the clutches C1, C2 and C3. In a first operating mode, M1, for example, the clutch C1 is applied, e.g., engaged, while the clutches C2 and C3 are released, e.g., disengaged, and in this mode forward or reverse launch can be accomplished, and the vehicle carrying the transmission 14 can be operated at vehicle speeds up to about 10 miles per hour. In a second operating mode, M2, as another example, the clutch C2 is engaged while the clutches C1 and C3 are disengaged, and in this mode the vehicle can be operated at vehicle speeds in the range of about 10-30 miles per hour. In a third operating mode, M3, as yet another example, the clutch C3 is engaged while the clutches C1 and C2 are disengaged, and in this mode the vehicle can be operated at vehicle speeds greater than about 30 miles per hour. In a fourth mode, M0, as a final example, the clutches C1, C2 and C3 are all disengaged, and in this mode the transmission 14 is in neutral. Within each operating mode, torque applied to the output shaft 22 of the transmission 14 is controlled by the variator, e.g., the variator 40. In the transitional states between the various operating modes M1, M2 and M3, the variator torque is illustratively reversed to assist transitions from one operating mode to the next.

The system 10 further includes a transmission control circuit 30 that controls and manages the overall operation of the transmission 14. The transmission control circuit 30 includes a number, M, of operating parameter inputs, $OP_1$-$OP_M$, that are electrically connected to corresponding operating parameter sensors included within the electro-hydraulic control system 24 via corresponding signal paths $26_1$-$26_M$, wherein M may be any positive integer. The one or more operating parameter sensors included within the electro-hydraulic control system 24, examples of which will be described hereinafter, produce corresponding operating parameter signals on the signal paths $26_1$-$26_M$, which are received by the transmission control circuit 30. The transmission 14 further includes a number, N, of electrically controllable actuators included within the electro-hydraulic control system 24 that are each electrically connected to different one of a corresponding number of actuator control outputs, $AC_1$-$AC_N$ of the transmission control circuit 30 via corresponding signal paths $28_1$-$28_N$, wherein N may be any positive integer. The one or more electrically controllable actuators included within the electro-hydraulic control system 24, examples of which will be described hereinafter, are responsive to actuator control signals produced by the transmission control circuit 30 on the corresponding signal paths $28_1$-$28_N$ to control various operational features of the transmission 14.

Illustratively, the transmission control circuit 30 is microprocessor-based, and includes a memory unit 32 having instructions stored therein that are executable by the control circuit 30 to control operation of the transmission 14 generally, and more specifically to control operation of the electro-hydraulic control system 24. It will be understood, however, that this disclosure contemplates other embodiments in which the transmission control circuit 30 is not microprocessor-based, but is configured to control operation of the transmission 14 generally and operation of the electro-hydraulic system 24 more specifically, based on one or more sets of hardwired instructions and/or software instructions stored in the memory unit 32.

Figure 3:
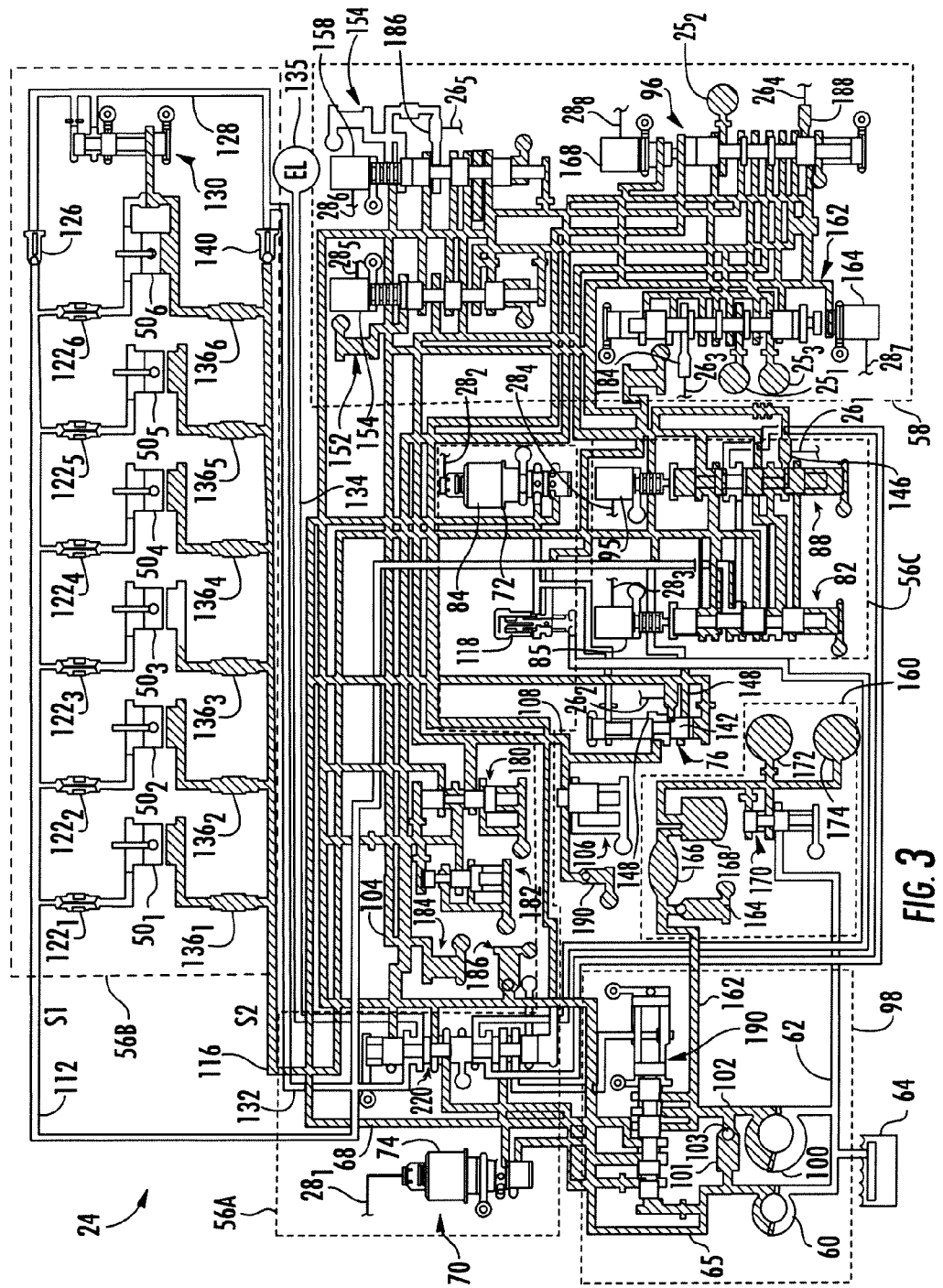
FIG. 3 is a schematic diagram of one illustrative embodiment of the electro-hydraulic control system that forms part of the toroidal traction drive automatic transmission illustrated in FIG. 1.

Referring now to FIG. 3, a schematic diagram is shown of one illustrative embodiment of the electro-hydraulic control system 24 of FIG. 1. In the illustrated embodiment, the electro-hydraulic control system 24 is roughly divided into separate control sections; a variator control section 56 comprising a variator trim control sub-system 56A, a variator actuator sub-system 56B and a variator switching sub-system 56C, a clutch control section 58, and a clutch and variator pressure control section 98.

Referring specifically to the clutch and variator pressure control section 98, a conventional fluid pump 60 is configured to supply transmission fluid, e.g., conventional transmission oil, to the variator trim control section 56A, the variator switching and fault detection section 56C and to the clutch control section 58 from a source 64 of transmission fluid, e.g., a conventional transmission sump 64. In one illustrative embodiment, the fluid pump 60 is a conventional positive-displacement pump that is driven by the drive shaft 16 of the engine 12 via the input shaft 18 of the transmission 14, and is sized and configured to supply pressurized fluid from the sump 64 to a number of friction control devices, e.g., clutches, and to the variator. In the illustrated embodiment, a fluid inlet of the fluid pump 60 is fluidly coupled to the sump 64 via a fluid passageway 62. A fluid outlet of the pump 60 is fluidly coupled via a clutch main fluid passageway 65 to a fluid port and end of a dual pump pressure regulator valve 190, to a fluid outlet of a check ball valve 101, to a fluid inlet of a variator trim valve 70, to a fluid port of a variator pressure multiplex valve 220, to a control main fluid passageway 104 via a conventional flow reducer, to a fluid port of a conventional main pressure regulator valve 180 and a fluid inlet of a main clutch pressure relief valve 186, and to fluid ports of two trim valves 152 and 154 included in the clutch control section 158. The clutch and variator pressure control section 98 further includes another conventional fluid pump 100 configured to supply transmission fluid, e.g., conventional transmission oil, to the dual pump pressure regulator valve 190 and, under some operating conditions, to the fluid path 65 to thereby supplement the supply of fluid by the fluid pump 60. In one illustrative embodiment, the fluid pump 100 is a conventional positive-displacement pump that is driven by the drive shaft 16 of the engine 12 via the input shaft 18 of the transmission 14, and is sized and configured to supply pressurized fluid to a conventional transmission lubrication system. In the illustrated embodiment, a fluid inlet of the fluid pump 100 is fluidly coupled to the sump 64 via the fluid passageway 62. A fluid outlet of the pump 100 is fluidly coupled via a fluid cooler/lube fluid passageway 102 to a fluid port of the dual pump pressure regulator valve 190 and to a fluid inlet of the check ball valve 101. Under some operating conditions of the electro-hydraulic control system 24, the dual pump pressure regulator valve 190 directs fluid supplied by the fluid pump 100 to a conventional cooler and lubrication sub-system 160 of the transmission 14 via a fluid path 162. In the illustrated embodiment, the fluid path 162 is fluidly coupled to a fluid inlet of a cooler relief valve 164 and to a fluid inlet of a conventional cooler 166. A fluid outlet of the cooler 166 is fluidly coupled through a fluid filter 168 to a fluid port and end of a gear lubrication regulator valve 170 and to gear lubrication and variator lubrication passageways 172 and 174 respectively. Further details relating to the structure and operation of the clutch and variator pressure control section 98 generally, and to the structure and operation of the dual pump pressure regulator valve 190 in particular, are described in co-pending U.S. Patent Application Ser. No. 61/423,296, the disclosure of which is incorporated herein by reference in its entirety.

The control main fluid passageway 104 is fluidly coupled to fluid inlets and fluid ports of the control main pressure regulator valve 180 and a conventional control main pressure relief valve 182, to a fluid inlet of a conventional control main pressure accumulator valve 184, to control main inputs of actuators 154, 158, 164, 168, 85 and 87 and to fluid ports of valves 152, 154, 162, 96, 82, 88 and 76. The control main passageway 104 supplies control main fluid to the foregoing actuators and valves.

Referring now to the variator trim control sub-system 56A of the variator control section 56, a variator main fluid passageway 68 is fed, under certain operating conditions as described in detail in co-pending U.S. Patent Application Ser. No. 61/423,296, by the clutch main fluid passageway 65 via the dual pump pressure regulator valve 190. The variator main fluid passageway 68 is fluidly coupled to a fluid inlet of a variator trim valve 72 and to one end of a variator fault valve 76. The variator trim valve 72 includes an actuator 84 that is electrically connected to the transmission control circuit 30 via a signal path $28_2$. Another fluid inlet of the variator trim valve 72 is fluidly coupled to exhaust, and a fluid outlet of the variator trim valve 72 is fluidly coupled to an end of the variator fault valve 76 opposite the end to which the variator main fluid passageway is coupled, and is also fluidly coupled through a conventional mode damper 118, to a fluid port of the variator pressure multiplex valve 220. Another variator trim valve 70 includes an actuator 74 that is electrically connected to the transmission control circuit 30 via a signal path $28_1$. One fluid inlet of the variator trim valve 70 is fluidly coupled to the clutch main fluid passageway 65. Another fluid inlet of the variator trim valve 70 is fluidly coupled to exhaust, and a fluid outlet of the variator trim valve 70 is fluidly coupled to another fluid port of the variator pressure multiplex valve 220. The actuators 74 and 84 are illustratively conventional electronically actuated solenoids, and the trim valves 70 and 72 are illustratively variable-bleed valves that supply variable-pressure transmission fluid based on control signals produced by the transmission control circuit 30 on the signal paths $28_1$ and $28_2$ respectively.

Under normal operating conditions, the variator pressure multiplex valve 220 routes variator main fluid from the outlet of the mode damper 118 to the variator switching sub-system 56C and routes the fluid outlet of the variator trim valve 70 to an end chamber of the dual pump pressure regulator valve 190 such that under such normal operating conditions the variator trim valve 72 controls the variator switching sub-system 56C and the fluid pressures in the clutch main fluid passageway 65 and in the endload passageway of the variator actuator control sub-system 56B are modulated by the variator trim valve 70. Under other operating conditions, e.g., during cold start and/or certain fault conditions, the variator pressure multiplex valve 220 exhausts one end chamber of the dual pump pressure regulator valve 190 such that the dual pump regulator valve 190 regulates the fluid pressure in the clutch main fluid passageway 65 (and thus the fluid pressures in the other main fluid passageways) to a constant fluid pressure, and the variator pressure multiplex valve 220 further routes fluid from the clutch main fluid passageway 65 directly to the variator switching sub-system 56C such that under such other operating conditions the variator trim valve 70 controls the variator switching sub-system 56C. Further details relating to the structure and operation of the variator trim control sub-system 56A are described in U.S. Patent Application Ser. No. 61/423,297, the disclosure of which is incorporated herein by reference in its entirety.

Referring now to the variator actuator sub-system 56B of the variator control section 56, a fluid path 112 fluidly coupled to the variator switching sub-system 56C defines a variator high-side fluid passageway, S1, and a fluid path 116 also fluidly coupled to the variator switching subsection 56C defines a variator low-side fluid passageway, S2. In the embodiment illustrated in FIG. 3, the variator includes six actuators, $50_1$-$50_6$, e.g., conventional pistons, and the variator high-side fluid passageway 112 is fluidly coupled to the high side of each such actuator $50_1$-$50_6$ via a corresponding conventional damper $122_1$-$122_6$. A conventional check valve 126 is interposed between the variator high-side fluid passageway 112 and a fluid passageway 128. The variator low-side fluid passageway 116 is fluidly coupled to the low side of each actuator $50_1$-$50_6$ via a corresponding conventional damper $136_1$-$136_6$, and another conventional check valve 140 is interposed between the variator low-side fluid passageway 116 and the fluid passageway 128. The fluid passageway 128 is fluidly coupled to an endload relief valve 130, which is further fluidly coupled between the high side and the low side of the actuator $50_6$. Further details relating to one illustrative structure and method of operating the endload relief valve 130 are provided in co-pending U.S. Patent Application Ser. No. 61/287,020, the disclosure of which is incorporated herein by reference in its entirety.

The fluid passageway 128 is further fluidly coupled to another fluid passageway 132, and an endload port or passageway 135 is fluidly coupled to another fluid passageway 134. In the state of the variator multiplex valve 220 illustrated in FIG. 3, i.e., stroked, the fluid passageway 132 is fluidly coupled via the variator pressure multiplex valve 220 to the fluid passageway 134 such that the fluid pressure within the endload port or passageway 135 is supplied by the fluid passageway 128. Generally, the fluid pressure in the endload port or passageway 135 is the pressure load on the variator disks required to keep the variator disks from slipping. Under normal operating conditions, such as illustrated in FIG. 3, the variator pressure multiplex valve 220 fluidly couples the endload port or passageway 135 directly to the fluid passageway 128 such that the fluid pressure in the endload fluid passageway 128 is modulated by the fluid pressures in S1 and S2. Under other operating conditions, e.g., cold start and certain fault conditions, the variator pressure multiplex valve 220 routes a fluid at a fixed pressure, e.g., clutch main fluid in the clutch main fluid passageway 65, to the endload fluid port or passageway 135 via the fluid passageway 134, as is described in greater detail in co-pending U.S. Patent Application Ser. No. 61/423,297.

A variator fault valve 76 is fluidly coupled between the variator main fluid passageway 68 at one end and the fluid outlet of the variator trim valve 72 at its opposite end. The variator fault valve 76 illustratively includes a spool 142 which is responsive to a difference in pressure between the variator main fluid passageway 68 and the fluid outlet of the variator trim valve 72 to determine whether a variator fault exists. In the embodiment illustrated in FIG. 3, for example, if the fluid pressure in the variator main fluid passageway 68 is sufficiently greater than that in the fluid outlet of the variator trim valve 72, the spool 142 is forced upwardly and thereby fluidly couples the exhaust backfill fluid passageway (EB) 108 to the fluid passageway 144. This is the position of the spool 142 illustrated in FIG. 3. If instead the fluid pressure in the fluid outlet of the variator trim valve 72 is sufficiently greater than that in the variator main fluid passageway 68, the spool 142 is forced downwardly and thereby fluidly couples the control main (COM) fluid passageway 104 to the fluid passageway 144. Illustratively, the variator fault valve 76 is designed to have a specified amount of hysteresis between the two extreme positions of the spool 142, and in one embodiment the hysteresis is approximately 15-20% such that the differential pressure between variator main fluid passageway 68 and the fluid outlet of the variator trim valve 72 must be greater than about 15-20% before the spool 142 changes position. Those skilled in the art will appreciate that this hysteresis value is provided only by way of example and that other hysteresis values, or no hysteresis value, may alternatively be used.

Referring now to the variator switching sub-system 56C of the variator control section 56, a pair of variator control valves 82 and 88 each include an actuator 85 and 95 respectively that is electrically connected to the transmission control circuit 30 via a signal path $28_3$ and $28_4$ respectively. In the illustrated embodiment, the actuators 85 and 95 are illustratively conventional electronically actuated solenoids. The actuators 85 and 95 are responsive to control signals produced by the transmission control circuit 30 on the signal paths $28_3$ and $28_4$ respectively to selectively control the valves 82 and 88 to thereby selectively supply S1 and S2 fluid pressures provided by the variator trim valve 72 under normal operating conditions, or provided by the variator trim valve 70 under other operating conditions, e.g., cold start and certain fault conditions, to the variator actuator sub-system 56B of the variator control section 56. Further details relating to the structure and operation of the variator control valves 82 and 88 will be described hereinafter with respect to FIGS. 4-7.

Referring now to the clutch control section 58, the clutch main fluid passageway 65 is illustratively fluidly coupled to each of a pair of clutch trim valves 150 and 152 which together define a trim system. The clutch trim valves 150 and 152 each illustratively include an actuator 154 and 158 respectively that is electrically connected to the transmission control circuit 30 via a signal path $28_5$ and $28_6$ respectively. One control fluid inlet of each of the clutch trim valves 150 and 152 is fluidly coupled to the control main fluid passageway 104, and another control fluid inlet of each clutch trim valve 150 and 152 is fluidly coupled to exhaust. In the illustrated embodiment, the actuators 154 and 158 are illustratively conventional electronically actuated solenoids. Fluid outlets of each of the clutch trim valves 150 and 152 are fluidly coupled to fluid inlets of each of a pair of clutch control valves 162 and 96. The clutch trim valves 150 and 152 are each configured to selectively, i.e., under the control of the transmission control circuit 30 via signals produced by the transmission control circuit 30 on the signal paths $28_5$ and $28_6$ respectively, fluidly couple the clutch main fluid passageway 65 to the clutch control valves 162 and 96.

The clutch control valves 162 and 96 each illustratively include an electronic actuator, e.g., an electrically controlled solenoid, 164 and 168 respectively that is electrically connected to the transmission control circuit 30 via a signal path $28_7$ and $28_8$ respectively. One control fluid inlet of each clutch control valve 162 and 96 is fluidly coupled to the control main, COM, fluid passageway 104, and another control fluid inlet is fluidly coupled to exhaust. The clutch control valve 96 is further fluidly coupled directly to the C2 clutch fluid path $25_2$, and clutch main fluid or exhaust backfill is selectively applied to the C2 clutch via the fluid path $25_2$ via various combinations of states of the actuators 154, 158, 164 and 168. The clutch control valve 162 is further fluidly coupled directly to each of the C1 and C3 clutch fluid paths $25_1$ and $25_3$, and clutch main fluid or exhaust backfill is selectively routed through the clutch control valve 162 to the C1 clutch via the fluid passageway $25_1$ or to the C3 clutch via the fluid passageway $25_3$ via various combinations of states of the actuators 154, 158, 164 and 168. The clutches C1-C3 are thus selectively activated, i.e., engaged, and deactivated, i.e., disengaged, based on the operating states of the actuators 154, 158, 164 and 168 of the clutch trim valves 150 and 152 and the clutch control valves 162 and 96 respectively, by selectively routing clutch main fluid and exhaust backpressure through the control valves 162 and 96 to the various clutches C1-C3.

Further details relating to the structure and operation of the clutch control subsection 58 are provided in co-pending U.S. Patent Application Ser. No. 61/287,031, and in co-pending U.S. Patent Application Ser. No. 61/287,038, the disclosures of which are both incorporated herein by reference in their entireties.

In the illustrated embodiment, sensors are operatively positioned relative to the variator fault valve 76, the variator control valve 88, the clutch trim valve 154 and each of the clutch control valves 162 and 96 to enable monitoring of the operating states of each of the valves 76, 88, 154, 162 and 96 and to further monitor certain transmission operating state faults. In one illustrative embodiment, such sensors are provided in the form of conventional pressure switches, although it will be understood that a conventional pressure sensor may be substituted for any one or more of the pressure switches. In the illustrated embodiment, for example, a pressure switch 146 is fluidly coupled to a fluid port of the variator control valve 88, and is electrically connected to the transmission control circuit 30 via a signal path $26_1$. Another pressure switch 148 is fluidly coupled to the fluid port 144 of the variator fault valve 76, and is electrically connected to the transmission control circuit 30 via a signal path $26_2$. Still another pressure switch 184 is fluidly coupled to a fluid port of the clutch control valve 162, and is electrically connected to the transmission control circuit 30 via a signal path $26_3$. Yet another pressure switch 188 is fluidly coupled to a fluid port of the clutch control valve 96, and is electrically connected to the transmission control circuit 30 via a signal path $26_4$. A further pressure switch 186 is fluidly coupled to a fluid port of the clutch trim valve 154, and is electrically connected to the transmission control circuit 30 via a signal path $26_5$.

Signals produced by the pressure switches 146, 148, 184, 188 and 186 are processed by the transmission control circuit 30 to allow monitoring and diagnosis by the transmission control circuit 30 of the states of these pressure switches and thus the operating states of the each of the valves 76, 88, 154, 162 and 96. For example, in the embodiment illustrated in FIG. 3, the pressure switch 148 is configured to produce a signal corresponding to the state, e.g., normal or variator fault, of the variator fault valve 76. If the fluid pressure in the variator main fluid passageway 68 is sufficiently greater than that in the fluid outlet of the variator trim valve 72 such that the spool 142 is forced upwardly and thereby fluidly couples the exhaust backfill fluid passageway (EB) 108 to the fluid passageway 144, as illustrated in FIG. 3, this corresponds to normal operation of the variator in which the pressure switch 148 produces a low or logical "0" signal. If instead the fluid pressure in the fluid outlet of the variator trim valve 72 is sufficiently greater than that in the variator main fluid passageway 68, the spool 142 is forced downwardly (not shown in the FIGS.) which causes the spool 142 to fluidly couple the control main (COM) fluid passageway 104 to the fluid passageway 144. This corresponds to a variator fault conditions and the pressure switch 148 under such a variator fault condition switches to a high or logical "1" state. Thus, under normal operating conditions the pressure switch 148 produces a low or "0" signal, and under variator fault conditions the pressure switch 148 produces a high or "1" signal. The memory 32 of the transmission control circuit 30 Illustratively includes instructions stored therein that are executable by the control circuit 30 to process the signal produced by the pressure switch 148 to determine whether the variator is operating normally or whether a variator fault exists.

Further details relating to diagnosis of the signals produced by the pressure switch 146 will be described hereinafter. Further details relating to diagnosis of the signals produced by the pressure switches 184, 186 and 188 are described in co-pending U.S. Patent Application Ser. No. 61/287,031.

Referring now to FIGS. 4-7, further details relating to the structure and operation of the variator switching sub-system 56C of the variator control section 56 are illustrated. In the embodiment illustrated in FIGS. 4-7, like reference numbers are used to identify like components of the variator switching sub-system 56C illustrated in FIG. 3. However, for ease of illustration and facilitation of understanding of the sub-system 56C, some of the connections of various fluid passageways are not shown and/or are truncated, and some of the sub-systems fluidly coupled to the variator switching sub-system 56C are shown in block form. For example, in FIGS. 4-7 the variator main fluid passageway 68 is shown as a block fluidly connected only to a fluid inlet of the variator trim valve 72, the control main fluid passageway 104 is shown as a block fluidly connected only to a fluid inlet of the variator switching valve 82, a fluid inlet of the variator switching valve 88 and to a fluid passageway 262 via a conventional flow reducer 260, and the exhaust backfill fluid passageway 108 is shown as a block fluidly connected to a fluid inlet of the mode damper 118 and fluidly coupled to the variator switching valve 88. The variator actuator sub-system 56B is likewise shown as a block and is fluidly coupled to the variator switching valves 82 and 88 via the fluid passageways 112 and 116. The variator fault valve 76 and fluid connections thereto are also omitted from FIGS. 4-7. Finally, although it will be understood that the fluid outlet of the mode damper 118 is, in the embodiment illustrated in FIG. 3, fluidly coupled to the variator pressure multiplex valve 220, this fluid coupling is omitted in FIGS. 4-7 and the fluid outlet of the mode damper 118 is instead illustrated as being fluidly coupled directly to the variator switching valves 82 and 88 via a fluid passageway 204. Thus, while pressurized fluid may be supplied to the variator switching sub-system 56C by either the variator trim valve 72 or the variator trim valve 70 depending upon the operating conditions of the transmission 14 as described in detail in co-pending U.S. Patent Application Ser. No. 61/423,297, FIGS. 4-7 show instead a direct fluid coupling between the fluid outlet of the mode damper 118 and the variator switching valves 82 and 88 for ease of illustration and understanding of the operation of the variator switching sub-system 56C. In short, operation of the variator switching valves 82 and 88 is the same regardless of whether the variator trim valve 72 or the variator trim valve 70 is supplying pressurized fluid thereto.

The variator trim valve 72 is illustratively a conventional variable-bleed valve that receives fluid at one fluid inlet from the variator main fluid passageway 68, receives exhaust at another fluid inlet, and operates in a conventional manner to supply variable-pressure transmission fluid at its outlet based on a control signal produced by the transmission control circuit 30 on the signal path $28_2$. The control signal on the signal path $28_2$ is received by a conventional solenoid 84 which serves as an actuator of the variator trim valve 72. The fluid outlet of the variator trim valve 72 is fluidly coupled to a fluid inlet of the mode damper 118 via a fluid passageway 202, another fluid inlet of the mode damper 118 is fluidly coupled to the exhaust backfill fluid passageway 108, and the fluid outlet of the mode damper 118 is fluidly coupled to both of the variator switching valves 82 and 88 via a fluid passageway 204.

Variable-pressure transmission fluid produced by the variator trim valve 72 at its fluid outlet is supplied to the variator switching sub-system 56C via the fluid passageway 204. Fixed pressure exhaust backfill fluid, e.g., outside ambient pressure, is supplied to the variator switching sub-system 56C via the fluid passageway 108. The variator switching sub-system 56C operates to selectively apply the variable pressure fluid in the fluid passageway 204 or the exhaust backfill fluid in the fluid passageway 108 to the variator actuator sub-system 56B as the high side fluid S1 via the fluid passageway 112, and to apply the other of the variable pressure fluid in the fluid passageway 204 or the exhaust backfill fluid in the fluid passageway 108 to the variator actuator sub-system 56B as the low side fluid S2 via the fluid passageway 116.

The variator switching valve 82 includes a spool 210 having one end 212 extending into a spring pocket 215 and an opposite end 216 fluidly coupled to a fluid outlet of an actuator 85. The actuator 85 further includes a fluid inlet fluidly coupled to the control main fluid passageway 104 and another fluid inlet fluidly coupled to exhaust. The actuator is illustratively a conventional solenoid actuator electrically connected to the control circuit 30 via the signal path $28_3$. The variator switching valve 82 is illustratively a conventional on-off valve that operates in a conventional manner based on control signals produced by the transmission control circuit 30 on the signal path $28_3$ and received by the solenoid actuator 85 to controllably stroke and destroke the valve 82. The spool 210 sequentially defines a number of lands 222, 224, 226 and 228 thereon between the end 216 fluidly coupled to the fluid outlet of the actuator 85 and the opposite end 212 extending into the spring pocket 215. A valve spring 214 is positioned in the spring pocket 215 of the variator switching valve 82, and the valve spring 214 exerts a biasing force against the end 212 of the spool 210 in the direction of the end 216 of the spool 210, i.e., in an upward direction in FIGS. 4-7.

The variator switching valve 88 includes a spool 230 having one end 232 extending into a spring pocket 233 and an opposite end 235 fluidly coupled to a fluid outlet of an actuator 95. The actuator 95 further includes a fluid inlet fluidly coupled to the control main fluid passageway 104 and another fluid inlet fluidly coupled to exhaust. The actuator is illustratively a conventional solenoid actuator electrically connected to the control circuit 30 via the signal path $28_4$. The variator switching valve 88 is illustratively a conventional on-off valve that operates in a conventional manner based on control signals produced by the transmission control circuit 30 on the signal path $28_4$ and received by the solenoid actuator 95 to controllably stroke and destroke the valve 88. The spool 230 sequentially defines a number of lands 236, 238, 240 and 242 thereon between the end 235 fluidly coupled to the fluid outlet of the actuator 95 and the opposite end 232 extending into the spring pocket 233. A valve spring 234 is positioned in the spring pocket 233 of the variator switching valve 88, and the valve spring 234 exerts a biasing force against the end 232 of the spool 230 in the direction of the end 235 of the spool 230, i.e., in an upward direction in FIGS. 4-7.

The fluid passageways 112 and 116 are illustratively fluidly coupled to both of the variator switching valves 82 and 88 at all times. A fluid passageway 251 is fluidly coupled between the fluid passageway 216 (S2) and the variator switching valve 82, a fluid passageway 253 is fluidly coupled between the fluid passageway 212 (S1) and the variator switching valve 82, a fluid passageway 255 is fluidly coupled between the exhaust backfill fluid passageway 108 (EB) and the variator switching valve 88, a fluid passageway 262 is fluidly coupled between the flow reducer 260 and the variator switching valve 88, and fluid passageways 250, 252, 254, 256 and 258 are fluidly coupled between the variator switching valves 82 and 88. The pressure sensor or pressure switch 146 is fluidly coupled to the fluid passageway 262, and is electrically connected to the control circuit 30 via the signal path $26_1$. The pressure sensor or switch 146 may be conventional, and is configured to produce a pressure signal on the signal path $26_1$ corresponding to fluid pressure within the fluid passageway 262.

The memory 32 of the control circuit 30 has instructions stored therein that are executable by the control circuit 30 to control operation of the variator trim valve 72 and operation of the variator switching valves 82 and 88, to process the pressure signal produced by the pressure sensor or switch $26_1$ to determine the pressure in the fluid passageway 262, and to determine from the pressure in the fluid passageway 262 whether the variator switching valves are in certain operating states.

Referring now specifically to FIG. 4, a first operating state of the variator switching valves 82 and 88 is shown in which the variator switching valves 82 and 88 are shown both in their destroked states. In the destroked state of the variator switching valve 82, the actuator 85 has been controlled by the control circuit 30 to exhaust the fluid outlet thereof so that the valve spring 214 biases the spool 210 upwardly with the end 216 of the spool 210 proximate to the fluid outlet of the actuator 85. In the destroked state of the variator switching valve 88, the actuator 95 has likewise been controlled by the control circuit 30 to exhaust the fluid outlet thereof so that the valve spring 234 biases the spool 230 upwardly with the end 235 of the spool 230 proximate to the fluid outlet of the actuator 95. In this first operating state of the variator switching valves 82 and 88, the variator switching valve 82 fluidly couples fluid passageway 251 to the fluid passageways 116 and 252 between the lands 222 and 224, and blocks one terminal end of the fluid passageway 116 with the land 226. The variator switching valve 88 fluidly couples the exhaust backfill fluid passageway 108 to the fluid passageway 252 between the lands 236 and 238, such that together the variator switching valves 82 and 88 fluidly connect the low side fluid passageway 116 (S2) to the lower pressure exhaust backfill (EB) fluid passageway 108. The variator switching valve 88 fluidly couples the variable pressure fluid passageway 204 to the fluid passageway 250 between the lands 238 and 240, and the variator switching valve 82 fluidly couples the fluid passageways 250 and 253 between the lands 224 and 226, such that together the variator switching valves 82 and 88 fluidly connect the high side fluid passageway 112 (S1) to the higher pressure fluid passageway 204. Illustratively, the variator actuator subsystem 56B is operable to control the rollers, e.g., rollers $48_1$ and $48_2$ of FIGS. 2A and 2B, to apply positive torque to the torroidal disks, e.g., disks 42 and 44 of FIGS. 2A and 2B, when the pressure in the high side fluid passageway 112 (S1) is greater than that in the low side fluid passageway 116 (S2) as illustrated in FIG. 4. Alternatively, the variator actuator sub-system 56B may be configured to control the rollers to apply negative torque to the torroidal disks when the pressure in the high side fluid passageway 112 (S1) is greater than that in the low side fluid passageway 116 (S2) as illustrated in FIG. 4.

In the first operational state of the variator switching valves 82 and 88 illustrated in FIG. 4, one end of the fluid passageway 254 and one end of the exhaust backfill fluid passageway 108 is blocked by the land 240 of the variator switching valve 88, and the opposite end is fluidly coupled to the fluid passageway 256 between the lands 226 and 228 of the variator switching valve 82. The variator switching valve 88 further fluidly couples the fluid passageway 256 to the fluid passageway 262 between the lands 240 and 242. Both ends of the fluid passageway 258 are blocked by the land 228 of the variator switching valve 82 and the land 242 of the variator switching valve 88. Illustratively, at least the land 240 does not form a fluid-tight seal within the valve 88 such that exhaust backfill fluid can pass through from the exhaust backfill fluid passageway 108 to the fluid passageway 254. Alternatively or additionally, at least the land 240 may define an annular channel therein which allows or facilitates fluid leakage around the land 224. The flow restrictor 260 sufficiently reduces the flow of fluid from the control main fluid passageway 104 into the fluid passageway 262 such that the fluid pressure in the fluid passageway 262 in the first operational state of the variator switching valves 82 and 88 is exhaust backfill, and the pressure sensor or switch $26_1$ is illustratively responsive to the backfill fluid pressure in the fluid passageway 262 to produce a low level pressure signal, e.g., a logic low or "0" state. In alternative embodiments, the pressure sensor or switch $26_1$ may be configured to be responsive to the backfill fluid pressure in the fluid passageway 262 to produce a high level pressure signal, e.g., a logic high or "1" state.

In the illustrated embodiment, the variator switching valves 82 and 88 are operable in the first operational state thereof, in which both valves 82 and 88 are controlled to a destroked state by the control circuit 30, to supply the variable pressure fluid in the fluid passageway 204 to the high side fluid passageway 112 (S1) and to supply the lower pressure exhaust backfill fluid in the exhaust backfill fluid passageway 108 to the low side fluid passageway 116 (S2). In this first operational state, the pressure sensor or switch $26_1$ illustratively produces a low level pressure signal, which is indicative of the destroked state of both variator switching valves 82 and 88.

Referring now to FIG. 5, a second operating state of the variator switching valves 82 and 88 is shown in which the variator switching valves 82 and 88 are both in their stroked states. In the stroked state of the variator switching valve 82, the actuator 85 has been controlled by the control circuit 30 to fluidly couple the control main fluid inlet to the fluid outlet thereof such that fluid from the control main fluid passageway 104 is supplied to the end 216 of the spool 210. The pressure of fluid in the control main fluid passageway 104 is sufficient to overcome the biasing force of the valve spring 214 so that the spool 210 is forced downwardly by the control main fluid against the bias of the valve spring 214 to the position illustrated in FIG. 5 in which the end 212 of the spool 210 extends fully into the spring pocket 215 and the end 216 is spaced apart from the fluid outlet of the actuator 85. In the stroked state of the variator switching valve 88, the actuator 95 has likewise been controlled by the control circuit 30 to fluidly couple the control main fluid inlet to the fluid outlet thereof such that fluid from the control main fluid passageway 104 is supplied to the end 235 of the spool 230. The pressure of fluid in the control main fluid passageway 104 is sufficient to overcome the biasing force of the valve spring 234 so that the spool 230 is forced downwardly by the control main fluid against the bias of the valve spring 234 to the position illustrated in FIG. 5 in which the end 232 of the spool 230 extends fully into the spring pocket 233 and the end 235 is spaced apart from the fluid outlet of the actuator 95. In this second operating state of the variator switching valves 82 and 88, the land 222 of the variator switching valve 82 blocks the fluid passageway 251, and fluidly couples the low side fluid passageway 116 (S2) to the fluid passageway 250 between the lands 224 and 226. The variator switching valve 88 fluidly couples the exhaust backfill fluid passageway 108 to the fluid passageways 250 and 254 between the lands 238 and 240, such that together the variator switching valves 82 and 88 fluidly connect the low side fluid passageway 116 (S2) to the lower pressure exhaust backfill (EB) fluid passageway 108. The variator switching valve 88 fluidly couples the variable pressure fluid passageway 204 to the fluid passageway 252 between the lands 236 and 238, and the variator switching valve 82 fluidly couples the fluid passageways 252 and 253 between the lands 222 and 224, such that together the variator switching valves 82 and 88 fluidly connect the high side fluid passageway 112 (S1) to the higher pressure fluid passageway 204.

In the second operational state of the variator switching valves 82 and 88 illustrated in FIG. 5, the fluid passageway 254 is fluidly coupled to the fluid passageway 258 between the lands 226 and 228 of the variator switching valve 82. The variator switching valve 88 further fluidly couples the fluid passageway 258 to the fluid passageway 262 between the lands 240 and 242. Both ends of the fluid passageway 256 are blocked by the land 226 of the variator switching valve 82 and the land 240 of the variator switching valve 88. The exhaust backfill fluid passageway 108 is thus fluidly coupled through the variator switching valves 82 and 88 to the fluid passageway 262. The flow restrictor 260 sufficiently reduces the flow of fluid from the control main fluid passageway 104 into the fluid passageway 262 such that the fluid pressure in the fluid passageway 262 in the second operational state of the variator switching valves 82 and 88 is at exhaust backfill, and the pressure sensor or switch 26₁ is illustratively responsive to the backfill fluid pressure in the fluid passageway 262 to produce a low level pressure signal, e.g., a logic low or "0" state. In alternative embodiments, the pressure sensor or switch 26₁ may be configured to be responsive to the backfill fluid pressure in the fluid passageway 262 to produce a high level pressure signal, e.g., a logic high or "1" state.

In the illustrated embodiment, the variator switching valves 82 and 88 are operable in the second operational state thereof, in which both valves 82 and 88 are controlled to a stroked state by the control circuit 30, to supply the variable pressure fluid in the fluid passageway 204 to the high side fluid passageway 112 (S1) and to supply the lower pressure exhaust backfill fluid in the exhaust backfill fluid passageway 108 to the low side fluid passageway 116 (S2). In this second operational state, the pressure sensor or switch 26₁ illustratively produces a low level pressure signal, which is indicative of the stroked state of both variator switching valves 82 and 88.

Referring now to FIG. 6, a third operating state of the variator switching valves 82 and 88 is shown in which the variator switching valve 82 is in a stroked state and the variator switching valve 88 is in a destroked state. In the stroked state of the variator switching valve 82, the actuator 85 has been controlled by the control circuit 30 to fluidly couple the control main fluid inlet to the fluid outlet thereof such that fluid from the control main fluid passageway 104 is supplied to the end 216 of the spool 210. The pressure of fluid in the control main fluid passageway 104 is sufficient to overcome the biasing force of the valve spring 214 so that the spool 210 is forced downwardly by the control main fluid against the bias of the valve spring 214 to the position illustrated in FIG. 6 in which the end 212 of the spool 210 extends fully into the spring pocket 215 and the end 216 is spaced apart from the fluid outlet of the actuator 85. In the destroked state of the variator switching valve 88, the actuator 95 has been controlled by the control circuit 30 to exhaust the fluid outlet thereof so that the valve spring 234 biases the spool 230 upwardly with the end 235 of the spool 230 proximate to the fluid outlet of the actuator 95. In this third operating state of the variator switching valves 82 and 88, the land 222 of the variator switching valve 82 blocks the fluid passageway 251, and fluidly couples the low side fluid passageway 116 (S2) to the fluid passageway 250 between the lands 224 and 226. The variator switching valve 88 fluidly couples the variable pressure fluid passageway 204 to the fluid passageway 250 between the lands 238 and 240, such that together the variator switching valves 82 and 88 fluidly connect the low side fluid passageway 116 (S2) to the variable pressure fluid passageway 204. The variator switching valve 88 fluidly couples the fluid passageway 255 to the fluid passageway 252 between the lands 236 and 238, and the variator switching valve 82 fluidly couples the fluid passageways 252 and 253 between the lands 222 and 224, such that together the variator switching valves 82 and 88 fluidly connect the high side fluid passageway 112 (S1) to the lower pressure exhaust backfill fluid passageway 108. Illustratively, the variator actuator sub-system 56B is operable to control the rollers, e.g., rollers 48₁ and 48₂ of FIGS. 2A and 2B, to apply negative torque to the torroidal disks, e.g., disks 42 and 44 of FIGS. 2A and 2B, when the pressure in the low side fluid passageway 116 (S2) is greater than that in the high side fluid passageway 112 (S1) as illustrated in FIG. 6. Alternatively, the variator actuator sub-system 56B may be configured to control the rollers to apply positive torque to the torroidal disks when the pressure in the low side fluid passageway 116 (S2) is greater than that in the high side fluid passageway 112 (S1) as illustrated in FIG. 6.

In the third operational state of the variator switching valves 82 and 88 illustrated in FIG. 6, the fluid passageways 108 and 254 are blocked by the land 240 of the variator switching valve 88. The variator switching valve 82 fluidly couples the fluid passageways 254 and 258 between the lands 226 and 228, and the variator switching valve 88 blocks the fluid passageway 258 with the land 242. The fluid passageway 256 is blocked at one end by the land 226 of the variator switching valve 82, and the variator switching valve 88 fluidly couples the fluid passageways 256 and 262 between the lands 240 and 242. Because the end of the fluid passageway 256 is blocked by the land 226 of the variator switching valve 82, fluid from the control main fluid passageway 104 passes through the flow restrictor 260 and establishes control main fluid pressure in the fluid passageway 262. The fluid pressure in the fluid passageway 262 in the third operational state of the variator switching valves 82 and 88 is thus at the control main fluid pressure, and the pressure sensor or switch 26₁ is illustratively responsive to the control main fluid pressure in the fluid passageway 262 to produce a high level pressure signal, e.g., a logic high or "1" state. In alternative embodiments, the pressure sensor or switch 26₁ may be configured to be responsive to the control main fluid pressure in the fluid passageway 262 to produce a low level pressure signal, e.g., a logic low or "0" state.

In the illustrated embodiment, the variator switching valves 82 and 88 are operable in the third operational state thereof, in which the variator switching valve 82 is controlled to a stroked state and the variator switching valve 88 is controlled to a destroked state by the control circuit 30, to supply the variable pressure fluid in the fluid passageway 204 to the low side fluid passageway 116 (S2) and to supply the lower pressure exhaust backfill fluid in the exhaust backfill fluid passageway 108 to the high side fluid passageway 112 (S1). In this third operational state, the pressure sensor or switch 26₁ illustratively produces a high level pressure signal, which is indicative of the stroked state of the variator switching valve 82 and the destroked state of the variator switching valve 88.

Referring now to FIG. 7, a fourth operating state of the variator switching valves 82 and 88 is shown in which the variator switching valve 82 is in a destroked state and the variator switching valve 88 is in a stroked state. In the stroked state of the variator switching valve 88, the actuator 95 has been controlled by the control circuit 30 to fluidly couple the control main fluid inlet to the fluid outlet thereof such that fluid from the control main fluid passageway 104 is supplied to the end 235 of the spool 230. The pressure of fluid in the control main fluid passageway 104 is sufficient to overcome the biasing force of the valve spring 234 so that the spool 230 is forced downwardly by the control main fluid against the bias of the valve spring 234 to the position illustrated in FIG. 7 in which the end 232 of the spool 230 extends fully into the spring pocket 233 and the end 235 is spaced apart from the fluid outlet of the actuator 95. In the destroked state of the variator switching valve 82, the actuator 85 has been controlled by the control circuit 30 to exhaust the fluid outlet thereof so that the valve spring 214 biases the spool 210 upwardly with the end 216 of the spool 210 proximate to the fluid outlet of the actuator 85. In this fourth operating state of the variator switching valves 82 and 88, the variator switching valve 82 fluidly couples the fluid passageways 251 and 252 between the lands 222 and 224, and the variator switching valve 88 fluidly couples the variable pressure fluid passageway 204 to the fluid passageway 252 between the lands 236 and 238. Together the variator switching valves 82 and 88 thus fluidly connect the low side fluid passageway 116 (S2) to the variable pressure fluid passageway 204. The land 236 of the variator switching valve 88 blocks the fluid passageway 255, and the variator switching valve 88 fluidly couples the exhaust backfill fluid passageway 108 to the fluid passageways 250 and 254 between the lands 238 and 240. The variator switching valve 82 fluidly couples the fluid passageways 250 and 253 between the lands 224 and 226, such that together the variator switching valves 82 and 88 fluidly connect the high side fluid passageway 112 (S1) to the lower pressure exhaust backfill fluid passageway 108.

In the fourth operational state of the variator switching valves 82 and 88 illustrated in FIG. 7, the variator switching valve 82 fluidly couples the fluid passageways 254 and 256 between the lands 226 and 228, and the fluid passageway 256 is blocked by the land 240 of the variator switching valve 88. The fluid passageway 258 is blocked at one end by the land 228 of the variator switching valve 82, and the variator switching valve 88 fluidly couples the fluid passageways 258 and 262 between the lands 240 and 242. Because the end of the fluid passageway 258 is blocked by the land 228 of the variator switching valve 82, fluid from the control main fluid passageway 104 passes through the flow restrictor 260 and establishes control main fluid pressure in the fluid passageway 262. The fluid pressure in the fluid passageway 262 in the fourth operational state of the variator switching valves 82 and 88 is thus at the control main fluid pressure, and the pressure sensor or switch $26_1$ is illustratively responsive to the control main fluid pressure in the fluid passageway 262 to produce a high level pressure signal, e.g., a logic high or "1" state. In alternative embodiments, the pressure sensor or switch $26_1$ may be configured to be responsive to the control main fluid pressure in the fluid passageway 262 to produce a low level pressure signal, e.g., a logic low or "0" state.

In the illustrated embodiment, the variator switching valves 82 and 88 are operable in the fourth operational state thereof, in which the variator switching valve 82 is controlled to a destroked state and the variator switching valve 88 is controlled to a stroked state by the control circuit 30, to supply the variable pressure fluid in the fluid passageway 204 to the low side fluid passageway 116 (S2) and to supply the lower pressure exhaust backfill fluid in the exhaust backfill fluid passageway 108 to the high side fluid passageway 112 (S1). In this fourth operational state, the pressure sensor or switch $26_1$ illustratively produces a high level pressure signal, which is indicative of the destroked state of the variator switching valve 82 and the stroked state of the variator switching valve 88.

In the embodiment of the variator switching sub-system 56C illustrated in FIGS. 3-7, the variator switching valves 82 and 88 each receive the variable pressure fluid supplied by the variator trim valve 72 (or supplied by the variator trim valve 70 under some operating conditions of the transmission 14) and the exhaust backfill fluid supplied by the exhaust backfill fluid passageway 108. The pressure of fluid in the fluid passageway, while variable, always exceeds that of the exhaust backfill pressure. In alternate embodiments, a fixed pressure reference fluid other than the exhaust backfill fluid may be supplied to the variator switching valves in place of the exhaust backfill fluid. In any case, the two variator switching valves 82 and 88 together define four different operational states. In each of two of the four different operational states the variator switching valves 82 and 88 supply the variable pressure fluid to the high side fluid inlet of the variator actuator sub-system 56B and the exhaust backfill fluid to the low side fluid inlet of the variator actuator sub-system 56B, and in each of the remaining two of the four different operational states the variator switching valves 82 and 88 supply the exhaust backfill fluid to the high side fluid inlet of the variator actuator sub-system 56B and the variable pressure fluid to the low side fluid inlet of the variator actuator sub-system 56B.

In the illustrated embodiment, the variator switching valves 82 and 88 supply the variable pressure fluid to the high side fluid inlet of the variator actuator sub-system 56B and the exhaust backfill fluid to the low side fluid inlet of the variator actuator sub-system 56B when the variator switching valves 82 and 88 are both stroked and when the variator switching valves 82 and 88 are both destroked. The variator switching valves 82 and 88 supply the exhaust backfill fluid to the high side fluid inlet of the variator actuator sub-system 56B and the variable pressure fluid to the low side fluid inlet of the variator actuator sub-system 56B when the variator switching valve 82 is stroked and the variator switching valve 88 is destroked and also when the variator switching valve 88 is stroked and the variator switching valve 82 is destroked. In alternative embodiments, the variator switching valves 82 and 88 may instead supply the exhaust backfill fluid to the high side fluid inlet of the variator actuator sub-system 56B and the variable pressure fluid to the low side fluid inlet of the variator actuator sub-system 56B when the variator switching valves 82 and 88 are both stroked and when the variator switching valves 82 and 88 are both destroked, and may supply the variable pressure fluid to the high side fluid inlet of the variator actuator sub-system 56B and the exhaust backfill fluid to the low side fluid inlet of the variator actuator sub-system 56B when the variator switching valve 82 is stroked and the variator switching valve 88 is destroked and also when the variator switching valve 88 is stroked and the variator switching valve 82 is destroked.

In any case, the memory 32 has instructions stored therein that are executable by the control circuit 30 to control the variator switching valves 82 and 88 between the four different operational states. For example, the variator switching valve 82 includes an actuator 85 that is responsive to a first control signal to control the variator switching valve 82 to the stroked operational state and to a second control signal to control the variator switching valve 82 to the destroked operational state, and the variator switching valve 88 includes an actuator 95 responsive to a third control signal to control the variator switching valve 88 to the stroked operational state and to a fourth control signal to control the variator switching valve 88 to the destroked operational state. The control circuit 30 illustratively produces the first, second, third and fourth control signals according to the instructions stored in the memory 32.

A pressure sensor $26_1$ is illustratively positioned in the fluid passageway 262 that is fluidly coupled to the variator switching valve 88. In one alternative embodiment, the pressure sensor $26_1$ may instead be positioned in a fluid passageway that is fluidly coupled to the variator switching valve 82. In other embodiments, the pressure sensor $26_1$ may be positioned in a fluid passageway that is fluidly coupled to both of the variator switching valves 82 and 88. In any case, the pressure sensor $26_1$ produces a pressure signal at one level, e.g., a low level or a high level, when the variator switching valves 82 and 88 are in either of two of the four different operational states and produces a pressure signal at a different level, e.g., a high level or a low level, when the variator switching valves 82 and 88 are in either of the remaining two of the four different operational states. In the illustrated embodiment, for example, the instructions stored in the memory 32 include instructions executable by the control circuit 30 to monitor operation of the pressure sensor $26_1$ and determine that the variator switching valves 82 and 88 are supplying the variable pressure fluid to the high side fluid inlet of the variator actuator sub-system 56B and the exhaust backfill fluid to the low side fluid inlet of the variator actuator sub-system 56B when the pressure sensor produces one level of the pressure signal, e.g., high or low level, and that the variator switching valves 82 and 88 are supplying the exhaust backfill fluid to the high side fluid inlet of the variator actuator sub-system 56B and the variable pressure fluid to the low side fluid inlet of the variator actuator sub-system 56B when the pressure a different level of the pressure signal, e.g., low or high level.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

The invention claimed is:

1. An apparatus for controlling a variator, the apparatus comprising:
   at least one actuator responsive to fluid pressure at separate high side and low side fluid inlets thereof to control torque applied to an input and an output of the variator, and
   first and second variator switching valves each configured to receive a first fluid at a first pressure and a second fluid at a fixed pressure less than the first pressure, the first and second variator switching valves selective to supply (i) one of the first fluid and the second fluid to the high side fluid inlet of the at least one actuator and (ii) the other of the first fluid and the second fluid to the low side fluid inlet of the at least one actuator.

2. The apparatus of claim 1, wherein (i) the first and second variator switching valves together define four different operational states, (ii) the one of the first fluid and the second fluid is supplied by the first and second variator switching valves to the high side fluid inlet of the at least one actuator during each of two of the four different operational states, and (iii) the other of the first fluid and the second fluid is supplied by the first and second variator switching valves to the high side fluid inlet of the at least one actuator during each of the remaining two of the four different operational states.

3. The apparatus of claim 1, wherein (i) each of the first and second variator switching valves defines a stroked state and an opposite destroked state, and (ii) the first and second variator switching valves supply the one of the first and the second fluid to the high side fluid inlet of the at least one actuator and the other of the first and the second fluid to the low side fluid inlet of the at least one actuator when the first and second variator switching valves are both stroked and when the first and second variator switching valves are both destroked.

4. The apparatus of claim 3, wherein the first and second variator switching valves supply the other of the first fluid and the second fluid to the high side fluid inlet of the at least one actuator and the one of the first fluid and the second fluid to the low side fluid inlet of the at least one actuator when (i) the first variator switching valve is stroked and the second variator switching valve is destroked and (ii) the first variator switching valve is destroked and the second variator switching valve is stroked.

5. The apparatus of claim 1, wherein (i) the input of the variator comprises a first toroidal disk, (ii) the output of the variator comprises a second toroidal disk, and (iii) torque is applied to the first and second toroidal disks by at least one roller of the variator.

6. The apparatus of claim 5, wherein (i) the at least one actuator is responsive to fluid pressure at the high side fluid inlet being greater than fluid pressure at the low side fluid inlet to control the at least one roller to transfer one of a positive and a negative torque to the first and second toroidal disks, and (ii) the at least one actuator is responsive to fluid pressure at the low side fluid inlet being greater than fluid pressure at the high side fluid inlet to control the at least one roller to transfer the other of the positive and negative torque to the first and second toroidal disks.

7. The apparatus of claim 2, further comprising a control circuit including a memory having instructions stored therein that are executable by the control circuit to control the first and second variator switching valves between the four different operational states.

8. The apparatus of claim 7, wherein (i) the first variator switching valve includes a first actuator responsive to a first control signal to control the first variator switching valve to a stroked operational state and to a second control signal to control the first variator switching valve to a destroked operational state, (ii) the second variator switching valve includes a second actuator responsive to a third control signal to control the second variator switching valve to a stroked operational state and to a fourth control signal to control the second variator switching valve to a destroked operational state, and (iii) the control circuit produces the first and second control signals according to the instructions stored in the memory.

9. The apparatus of claim 8, wherein the first and second variator switching valves supply the one of the first and the second fluid to the high side fluid inlet of the at least one actuator and the other of the first and the second fluid to the low side fluid inlet of the at least one actuator when (i) the first and second variator switching valves are both in their stroked operational states and (ii) the first and second variator switching valves are both in their destroked operational states.

10. The apparatus of claim 8, wherein the first and second variator switching valves supply the other of the first fluid and the second fluid to the high side fluid inlet of the at least one actuator and the one of the first fluid and the second fluid to the low side fluid inlet of the at least one actuator when one of the first and second variator switching valves is in its stroked state and the other of the first and second variator switching valves is in its destroked state.

11. The apparatus of claim 8, wherein (i) the input of the variator comprises a first toroidal disk, (ii) the output of the variator comprises a second toroidal disk, (iii) torque is applied to the first and second toroidal disks by at least one roller of the variator, (iv) the at least one actuator is responsive to fluid pressure at the high side fluid inlet being greater than fluid pressure at the low side fluid inlet to control the at least one roller to transfer one of a positive and a negative torque to the first and second toroidal disks, and (v) the instructions stored in the memory include instructions executable by the control circuit to produce the first and third control signals or the second and fourth control signals to control the at least one roller to transfer the one of the positive and the negative torque to the first and second toroidal disks.

12. The apparatus of claim 8, wherein (i) the input of the variator comprises a first toroidal disk, (ii) the output of the variator comprises a second toroidal disk, (iii) torque is applied to the first and second toroidal disks by at least one roller of the variator, (iv) the at least one actuator is responsive to fluid pressure at the low side fluid inlet being greater than fluid pressure at the high side fluid inlet to control the at least one roller to transfer one of a positive and a negative torque to the first and second toroidal disks, and (v) the instructions stored in the memory include instructions executable by the control circuit to produce the first and fourth control signals or the second and third control signals to control the at least one roller to transfer the one of the positive and the negative torque to the first and second toroidal disks.

13. The apparatus of claim 7, further comprising a pressure sensor fluidly coupled to at least one of the first and second variator switching valves such that the pressure sensor produces (i) a first sensor signal when the first and second variator switching valves are in either of the two of the four different operational states and (ii) a second sensor signal when the first and second variator switching valves are in either of the remaining two of the four different operational states.

14. The apparatus of claim 13, wherein (i) the pressure sensor is electrically connected to the control circuit, and (ii) the instructions stored in the memory include instructions executable by the control circuit to monitor operation of the pressure sensor and determine that the first and second variator switching valves are supplying the one of the first fluid and the second fluid to the high side fluid inlet of the at least one actuator and the other of the first fluid and the second fluid to the low side fluid inlet of the at least one actuator when the pressure sensor produces the first sensor signal and that the first and second variator switching valves are supplying the other of the first fluid and the second fluid to the high side fluid inlet of the at least one actuator and the one of the first fluid and the second fluid to the low side fluid inlet of the at least one actuator when the pressure sensor produces the second sensor signal.

15. A transmission comprising:
an input shaft configured to receive torque from a drive unit,
an output shaft configured to transmit torque to a load,
a variator including (i) an input coupled to the input shaft and (ii) an output coupled to the output shaft,
at least one actuator responsive to fluid pressure at separate high side and low side fluid inlets thereof to control torque applied to the input and the output of the variator,
first and second variator switching valves configured to each receive a first fluid at a first pressure and a second fluid at a fixed pressure less than the first pressure, the first and second variator switching valves being controllable to selectively supply (i) one of the first fluid and the second fluid to the high side fluid inlet of the at least one actuator and (ii) the other of the first fluid and the second fluid to the low side fluid inlet of the at least one actuator, and
a transmission control circuit including a memory having instructions stored therein that are executable by the transmission control circuit to control the first and second variator switching valves to supply (i) the one of the first fluid and the second fluid to the high side fluid inlet of the at least one actuator during each of two of four different operational states defined by the first and second variator switching valves and (ii) the other of the first fluid and the second fluid to the high side fluid inlet of the at least one actuator during each of the remaining two of the four different operational states.

16. The transmission of claim 15, wherein (i) the input of the variator comprises a first toroidal disk, (ii) the output of the variator comprises a second toroidal disk, and (iii) torque is applied to the first and second toroidal disks by at least one roller of the variator.

17. The transmission of claim 16, further comprising a pressure sensor fluidly coupled to at least one of the first and second variator switching valves, the pressure sensor configured to produce (i) a first signal when the first and second variator switching valves are supplying the one of the first fluid and the second fluid to the high side inlet of the at least one actuator and (ii) a second signal different from the first signal when the first and second variator switching valves are supplying the other of the first fluid and the second fluid to the high side inlet of the at least one actuator.

18. The transmission of claim 17, wherein (i) the transmission control circuit is electrically connected to the pressure sensor, and (ii) the instructions stored in the memory cause the transmission control circuit to monitor operation of the pressure sensor and determine that the first and second variator switching valves are supplying the one of the first fluid and the second fluid to the high side fluid inlet of the at least one actuator when the pressure sensor produces the first signal.

19. The transmission of claim 18, wherein the instructions stored in the memory cause the transmission control circuit to determine that the first and second variator switching valves are supplying the other of the first fluid and the second fluid to the high side fluid inlet of the at least one actuator when the pressure sensor produces the second signal.

20. A method executable by a transmission control circuit of a transmission, the transmission including a variator having an input, an output, and at least one actuator responsive to fluid pressure at separate high side and low side fluid inlets thereof to control torque applied to the input and the output, the method comprising:
supplying a first fluid at a first pressure and a second fluid at a fixed pressure less than the first pressure to first and second variator switching valves, the first variator switching valve having a first actuator and the second variator switching valve having a second actuator,
actuating each of the first and second actuators to move the first and second variator switching valves to respective stroked operational states so that (i) one of the first fluid and the second fluid is supplied to the high side fluid inlet of the at least one actuator and (ii) the other of the first fluid and the second fluid is supplied to the low side fluid inlet of the at least one actuator, and deactuating the second actuator to move the second variator switching valve to a destroked operational state opposite the stroked operational state so that (i) the other of the first fluid and the second fluid is supplied to the high side fluid inlet of the at least one actuator and (ii) the one of the first fluid and the second fluid is supplied to the low side fluid inlet of the at least one actuator.

* * * * *